(12) United States Patent
Harada et al.

(10) Patent No.: US 8,106,612 B2
(45) Date of Patent: Jan. 31, 2012

(54) BRUSHLESS MOTOR CONTROL DEVICE AND BRUSHLESS MOTOR CONTROL METHOD

(75) Inventors: Tomomi Harada, Hanno (JP); Tatsuya Arai, Hidaka (JP)

(73) Assignee: Shindegen Electric Manufacturing Co., Ltd., Tokyo (JP)

( * ) Notice: Subject to any disclaimer, the term of this patent is extended or adjusted under 35 U.S.C. 154(b) by 351 days.

(21) Appl. No.: 12/594,064

(22) PCT Filed: Mar. 28, 2008

(86) PCT No.: PCT/JP2008/056151
§ 371 (c)(1),
(2), (4) Date: Sep. 30, 2009

(87) PCT Pub. No.: WO2008/120734
PCT Pub. Date: Oct. 9, 2008

(65) Prior Publication Data
US 2010/0117572 A1 May 13, 2010

(30) Foreign Application Priority Data

Mar. 30, 2007 (JP) .............................. P2007-095451

(51) Int. Cl.
*H02P 1/04* (2006.01)
(52) U.S. Cl. ......... 318/400.17; 318/400.02; 318/400.04; 318/400.11; 318/400.32; 318/400.35
(58) Field of Classification Search ............ 318/400.17, 318/400.04, 400.02, 400.11, 400.32, 400.35
See application file for complete search history.

(56) References Cited

U.S. PATENT DOCUMENTS 6,577,097 B2 * 6/2003 Krefta et al. .................. 318/801
(Continued)

FOREIGN PATENT DOCUMENTS

JP 07-274585 10/1995
(Continued)

OTHER PUBLICATIONS

International Search Report for PCT/JP2008/056151, mailed May 27, 2008.

(Continued)

*Primary Examiner* — Walter Benson
*Assistant Examiner* — Erick Glass
(74) *Attorney, Agent, or Firm* — Nixon & Vanderhye P.C.

(57) ABSTRACT

A brushless motor control device according to the present invention drives a brushless motor including a stator having coils of three phases U, V, and W and a neutral line, and a sub coil provided in any one phase of the phases U, V, and W, for detecting a voltage induced in the coil of the one phase, and the brushless motor control device carries out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, and the brushless motor control device includes a motor control unit that controls the brushless motor based on information of the rotor stop position when activating the brushless motor, controls the brushless motor based on the first rotor position information when in the 120° conduction, and controls the brushless motor based on the second rotor position information when in the 180° conduction.

7 Claims, 13 Drawing Sheets

U.S. PATENT DOCUMENTS

| | | | |
|---|---|---|---|
| 7,166,975 B2* | 1/2007 | Mori et al. | 318/400.36 |
| 2001/0045812 A1 | 11/2001 | Seki et al. | |
| 2004/0012354 A1* | 1/2004 | Krefta et al. | 318/439 |
| 2009/0189556 A1* | 7/2009 | Itagaki et al. | 318/400.11 |
| 2010/0148710 A1* | 6/2010 | Lim et al. | 318/400.11 |

FOREIGN PATENT DOCUMENTS

| | | |
|---|---|---|
| JP | 10-257792 | 9/1998 |
| JP | 2001-275387 | 10/2001 |
| JP | 2001-327185 | 11/2001 |
| JP | 2002-186274 | 6/2002 |
| JP | 2003-111483 | 4/2003 |
| JP | 3673964 | 5/2005 |
| JP | 2006-081396 | 3/2006 |
| JP | 2007-20293 | 1/2007 |

OTHER PUBLICATIONS

Shun-ichi Kondo, "Brushless DC Motor Control Circuit Design", Transistor Technology, CQ Publishing Co. Ltd., pp. 212-220, Feb. 2000.

Satoshi Kusaka, "Brushless DC Motor Driving Method", Transistor Technology, CQ Publishing Co. Ltd., pp. 221-228, Feb. 2000.

* cited by examiner

US 8,106,612 B2

BRUSHLESS MOTOR CONTROL DEVICE AND BRUSHLESS MOTOR CONTROL METHOD

This application is the U.S. national phase of International Application No. PCT/JP2008/056151, filed 28 Mar. 2008, the entire contents of which is hereby incorporated by reference.

TECHNICAL FIELD

The present invention relates to a brushless motor control device for driving a brushless motor (brushless DC motor) to be used as a motor for a starter of an internal combustion engine (engine). The present invention relates, in particular, to a brushless motor control device and a brushless motor control method which can, without using a rotor position detecting sensor such as Hall element, activate when the motor is in a stop state, perform a 120° conduction when the motor is rotating at a low rotation speed, and perform a 180° conduction when the motor is rotating at a high rotation speed.

Priority is claimed on Japanese Patent Application No. 2007-95451, filed Mar. 30, 2007, the content of which is incorporated herein by reference.

BACKGROUND ART

In general, as a drive control method for a brushless motor used in a starter of an internal combustion engine, there is known a sensor type drive control circuit in which a plurality of Hall elements are implemented around a rotor, for detecting a position of the rotor (permanent magnet side) within the brushless motor. However, in this sensor type drive control circuit, a plurality of Hall elements need to be implemented and a position detection magnet or the like needs to be implemented separately from the rotor as necessary. Consequently, it has been an obstacle to reduction in size and reduction in cost. Moreover, a variation occurs in position detection accuracy due to the condition of the Hall element installation. Consequently, there has been a strong demand for realizing a sensorless type drive control circuit that detects a rotor position without the use of a sensor such as Hall element, and this has been realized at present.

In the conventional sensorless type drive control of a brushless motor, there is known a drive control method based on 120° conduction (a method in which electric power is conducted only during the 120° period of the entire 180° phase period) in which: a drive electric current is caused to flow to an armature coil at a high speed timing that does not cause the motor to rotate; then from the drive current rise characteristic thereof, a rotor stop position within the brushless motor is detected; a conduction start phase is then determined and the rotor is rotated; and having started conduction, a zero-cross point of the phase voltage of a non-conduction phase is detected, to thereby detect a rotor position. As other conduction method, there is the 180° conduction method in which a rotor position is obtained based on rotor position detection waveforms detected from a sub coil, and 180° conduction is performed to thereby perform drive control of a brushless motor (for example, refer to Patent documents 1, 2, 3, 4, and 5, and Non-patent documents 1 and 2).

[Patent document 1] Specification of Japanese Patent No. 3673964

[Patent document 2] Japanese Unexamined Patent Application, First Publication No. 2006-81396

[Patent document 3] Japanese Unexamined Patent Application, First Publication No. H10-257792

[Patent document 4] Japanese Unexamined Patent Application, First Publication No. H07-274585

[Patent document 5] Japanese Unexamined Patent Application, First Publication No. 2001-327185

[Non-patent document 1] Shun-ichi Kondo, "Brushless DC Motor Control Circuit Design", Transistor Technology, CQ Publishing Co. Ltd., pp. 212-220, February, 2000

[Non-patent document 2] Satoshi Kusaka, "Brushless DC Motor Driving Method", Transistor Technology, CQ Publishing Co. Ltd., pp. 221-228, February, 2000

DISCLOSURE OF INVENTION

Problem to be Solved by the Invention

However, in rotor drive control in a brushless motor of an internal combustion engine, the 120° conduction and 180° conduction need to be switched respectively for a low rotation speed and high rotation speed of the rotor. This is because power of the motor is required when rotating at a high rotation speed, and consequently power of the motor is obtained by the 180° conduction. In the 180° conduction, entire phase conduction is performed and consequently there is no non-conduction phase. Therefore, it becomes impossible to detect a zero-cross point. Consequently, there is a problem in that in the rotor position detection method based on zero-cross point detection, rotor drive control cannot be performed when rotating at a high rotation speed.

If the rotor is activated by a 180° conduction, there is a possibility that depending on the rotor position, the rotor may not operate or a driving element may be destroyed due to a high current flow. Moreover, when activating the rotor of the internal combustion engine, it is necessary to switch normal rotation and reverse rotation, depending on the rotor stop position. There is also a problem in that in rotor activation based on the 180° conduction, there is some uncertainty with the control of normal rotation and reverse rotation.

Due to such problems, the sensorless type driving method of the conventional brushless motor is not suitable for an area of power load such as with a motorcycle (two-wheel vehicle) and motor car, and consequently the application scope has been extremely limited.

The present invention has been achieved to solve the above problems. An object of the present invention is to provide a brushless motor control device and a brushless motor control method can, without implementing a Hall element in the respective phases U, V, and W of the brushless motor, or implementing a magnet for position detection separately from the rotor, reliably perform an activation when the motor is in a stop state, a 120° conduction when the motor is rotating at a low rotation speed, and a 180° conduction when the motor is rotating at a high rotation speed.

Means for Solving the Problem

The present invention has been realized to achieve the above object. A brushless motor control device according to a first aspect of the present invention drives a brushless motor including a stator having coils of three phases U, V, and W and a neutral line, and a sub coil provided in any one phase of the phases U, V, and W, for detecting a voltage induced in the coil of the one phase, the brushless motor control device carries out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, and the brushless motor control device includes: a current rise detecting circuit that, when the brushless motor is in a stop state, sequentially selects coils of two phases among the coils of the respective phases U, V, and W, applies positive and negative predetermined direct current voltages between the selected coils of the two phases, and detect a value of the electric current flowing to the selected coils of the two phases; a rotor stop position detecting unit that determines a rotor stop position of the brushless motor based on information of the value of the electric current flowing to the respective coils which is detected by the current rise detecting circuit; a zero-cross detecting circuit that, when the brushless motor is in a 120° conduction, detects zero-cross points of the coils of the respective phases U, V, and W and generates zero-cross signals; a rotor position detecting unit based on a zero-cross signal that determines a rotor position of the brushless motor based on the zero-cross signals of the coils of the respective phases U, V, and W generated by the zero-cross detecting circuit, and that outputs the same as first rotor position information; a triangular wave generating circuit that, when the brushless motor is in a 180° conduction, detects an output voltage of the sub coil, and generates a triangular wave signal synchronized with the output voltage; a rotor position detecting unit based on a triangular wave signal that determines a rotor position of the brushless motor based on the triangular wave signal generated by the triangular wave generating circuit, and outputs the same as second rotor position information; and a motor control unit that controls the brushless motor based on information of the rotor stop position when activating the brushless motor, controls the brushless motor based on the first rotor position information when in the 120° conduction, and controls the brushless motor based on the second rotor position information when in the 180° conduction.

In the brushless motor control device of the above configuration, in respective cases where the motor is in a stop state, where the motor is rotating at low rotation speed, and where the motor is rotating at high rotation speed, the rotor position detection method and brushless motor control methods are switched. In a case where the motor is in a stop state, a positive and negative direct current voltage are applied between two phase coils among the respective coils of U, V, and W phases, to thereby detect a rotor stop position based on a current rise characteristic. When the motor is rotating at a low rotation speed, a 120° conduction is performed. When performing the 120° conduction, a non-conduction phase occurs in the respective phases of U, V, and W, and consequently, based on the zero-cross point of the voltage induced in this non-conduction phase, a rotor position is detected. Moreover, in a case where the motor is rotating at a high rotation speed, a 180° conduction is performed, and there is generated a triangular wave signal that is synchronized with the voltage induced in the sub coil provided in any one phase of the phases U, V, and W, and a rotor position is detected based on this triangular wave signal. Moreover, 1/3 voltage, 2/3 voltage, and 3/3 voltage where the peak value of this triangular wave signal is divided into three, are taken as switching points of stages (stages of phase voltage per 60° to be applied to the phase coils U, V, and W). Thereby, the stages are switched while detecting the rotor position.

Thus, in the brushless motor, it becomes possible, without implementing a Hall element in the respective phases U, V, and W, or implementing a magnet for position detection separately from the rotor, to perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

The brushless motor control device according to the first aspect of the present invention may include: an engine rotation speed calculating unit that calculates a rotation speed of the engine, and the motor control unit may select the 120° conduction from a motor activation to the predetermined rotation speed, and may select the 180° conduction when the rotation speed is higher than or equal to the predetermined rotation speed, based on information of the rotation speed of the engine calculated by the engine rotation speed calculating unit, and may select the first rotor position information when in the 120° conduction, and may select the second rotor position information when in the 180° conduction, to thereby control the brushless motor.

In the brushless motor control device of the above configuration, rotation speed information (for example, pulsar signals of the engine) is obtained from the engine, and engine rotation speed is calculated. Based on this engine rotation speed, the 120° conduction is selected after the motor activation and to the predetermined rotation speed, and when this 120° conduction is performed, the first rotor position information (rotor position information generated based on zero-cross signal) is used to thereby control the brushless motor. Moreover, when the rotation speed is higher than or equal to the predetermined rotation speed, the 180° conduction is selected, and when this 180° conduction is performed, the second rotor position information (rotor position information generated based on triangular wave signal) is used to thereby control the brushless motor.

Thus, in the brushless motor, it becomes possible, without implementing a Hall element in the respective phases U, V, and W, or implementing a magnet for position detection separately from the rotor, to perform a 120° conduction in the brushless motor when the engine is rotating at or below the predetermined rotation speed, and a 180° conduction in the brushless motor when the engine is rotating at or above the predetermined rotation speed. Therefore, it is possible to supply an inexpensive brushless motor control device. Moreover, the number of components of a sensorless motor (brushless motor) can be reduced while reducing the size and weight thereof.

In the brushless motor control device according to the first aspect of the present invention, the triangular wave generating circuit may generate the triangular wave signal both when in the 120° conduction and in the 180° conduction, and the rotor position detecting unit based on the triangular wave signal may determine the rotor position based on the triangular wave generated by the triangular wave generating circuit both when in the 120° conduction and in the 180° conduction.

In the brushless motor control device of the above configuration, a rotor position detection based on a triangular wave signal is performed when the 180° conduction is performed, and in addition, a rotor position detection based on a zero-cross signal and a rotor position detection based on a triangular wave signal are both performed when the 120° conduction is performed.

Thus, when in the 120° conduction both of the rotor position based on a zero-cross signal and the rotor position based on the triangular wave signal are compared, and it is thereby possible to verify the validity thereof. Moreover, when shifting from the 120° conduction to the 180° conduction, or shifting from the 180° conduction to the 120° conduction (when switching the rotor position detection method), both of the rotor position based on a zero-cross signal and the rotor position based on a triangular wave signal are compared, and it is thereby possible to verify the validity of rotor position switching.

The brushless motor control device according to the first aspect of the present invention may include: a rotor position information switching determination unit that determines whether or not to perform switching between the first rotor position information and the second rotor position information by comparing the engine rotation speed obtained from the engine rotation speed calculating unit with a predetermined rotation speed, and outputs a switching signal in a case where it is determined to perform switching; a rotor position information matching unit that determines matching between the first rotor position information and the second rotor position information according to a predetermined criterion, based on the switching signal output from the rotor position information switching determination unit; and a rotor position information switching unit that switches between the first rotor position information and the second rotor position information and outputs it to the motor control unit, in a case where it is determined that there is matching by the rotor position information matching unit.

In the brushless motor control device of the above configuration, a case where the engine rotation speed is about to exceed the predetermined rotation speed, or a case where the engine rotation speed is about fall below the predetermined rotation speed, is detected, to thereby determine switching the rotor position information (the first rotor position information or the second rotor position information). In a case where the rotor position information is switched, the first rotor position information (rotor position based on a zero-cross signal) and the second rotor position information (rotor position based on a triangular wave signal) are compared for the matching therebetween, according to a predetermined criterion. For example, if the rotor position based on zero-cross detection (six segments from 0 to 5 per 60°) and the rotor position detection based on a triangular wave signal (six segments from 0 to 5 per 60°) are same, then it will be determined that there is matching therebetween. In a case where it is determined that there is matching between the first rotor position information and the second rotor position information, the first rotor position information and the second rotor position information are switched to be output to the motor control unit.

Thus, in a case where the methods for rotor position detection are switched at a boundary of a predetermined rotation speed, it is possible to determine the matching therebetween.

A brushless motor control device according to a second aspect of the present invention drives a brushless motor including a stator having coils of three phases U, V, and W and a neutral line, and a sub coil provided in any one phase of the phases U, V, and W, for detecting a voltage induced in the coil of the one phase, the brushless motor control device carrying out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, and the brushless motor control device includes: a current rise detecting circuit that, when the brushless motor is in a stop state, sequentially selects coils of two phases among the coils of the respective phases U, V, and W, applies positive and negative predetermined direct current voltages between the selected coils of the two phases, and detects a value of the electric current flowing to the selected coils of the two phases; a rotor stop position detecting unit that determines a rotor stop position of the brushless motor based on information of the value of the electric current flowing to the respective coils which is detected by the current rise detecting circuit; a zero-cross detecting circuit that, when the brushless motor is in a 120° conduction, detects zero-cross points of the coils of the respective phases U, V, and W and generates zero-cross signals; a rotor position detecting unit based on a zero-cross signal that determines a rotor position of the brushless motor based on the zero-cross signals of the coils of the respective phases U, V, and W generated by the zero-cross detecting circuit, and that outputs the same as first rotor position information; a rotor position detecting unit based on a measurement of time between zero-crosses that, when the brushless motor is in a 180° conduction, detects an output voltage of the sub coil and detects zero-crosses of the output voltage, measures a time between adjacent zero-crosses of the detected output voltage, determines a rotor position of the brushless motor based on timing calculated from the measured time between the adjacent zero-crosses, and outputs the same as second rotor position information; and a motor control unit that controls the brushless motor based on information of the rotor stop position when activating the brushless motor, controls the brushless motor based on the first rotor position information when in the 120° conduction, and controls the brushless motor based on the second rotor position information when in the 180° conduction.

In the brushless motor control device of the above configuration, in respective cases where the motor is in a stop state, where the motor is rotating at low rotation speed, and where the motor is rotating at high rotation speed, the rotor position detection method and brushless motor control methods are switched. In a case where the motor is in a stop state, a positive and negative direct current voltage are applied between two phase coils among the respective coils of U, V, and W phases, to thereby detect a rotor stop position based on a current rise characteristic. When the motor is rotating at a low rotation speed, a 120° conduction is performed. When performing the 120° conduction, a non-conduction phase occurs in the respective phases of U, V, and W, and consequently, based on the zero-cross point of the voltage induced in this non-conduction phase, a rotor position is detected. Moreover, in a case where the motor is rotating at a high rotation speed, a 180° conduction is performed, zero-crosses of the voltage (output voltage of the sub coil) induced in the sub coil provided in any one phase of the phases U, V, and W, are detected, the time between the adjacent zero-crosses of the detected output voltage is measured, and the rotor position of the brushless motor is detected based on timing calculated from the measured time between the adjacent zero-crosses. Moreover, 1/3T, 2/3T, and 3/3T where the time T between the adjacent zero-crosses is divided into three, are taken as switching points of stages (stages of phase voltage per 60° to be applied to the phase coils U, V, and W). Thereby, the stages are switched while detecting the rotor position.

Thus, in the brushless motor, it becomes possible, without implementing a Hall element in the respective phases U, V, and W, or implementing a magnet for position detection separately from the rotor, to perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

A brushless motor control method according to a third aspect of the present invention is for a brushless motor control device that drives a brushless motor used as a starter motor of an engine, including a stator having coils of three phases U, V, and W and a neutral line, and a sub coil provided in any one phase of the phases U, V, and W, for detecting a voltage induced in the coil of the one phase, the brushless motor control device carries out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, and the brushless motor control method includes: a current rise detecting step of, when the brushless motor is in a stop state, sequentially selecting coils of two phases among the coils of the respective phases U, V, and W, applying positive and negative predetermined direct current voltages between the selected coils of the two phases, and detecting a value of the electric current flowing to the selected coils of the two phases; a rotor stop position detecting step of determining a rotor stop position of the brushless motor based on information of the value of the electric current flowing to the respective coils which is detected in the current rise detecting step; a zero-cross detecting step of, when the brushless motor is in a 120° conduction, detecting zero-cross points of the coils of the respective phases U, V, and W and generating zero-cross signals; a rotor position detecting step based on a zero-cross signal of determining a rotor position of the brushless motor based on the zero-cross signals of the coils of the respective phases U, V, and W generated by the zero-cross detecting step, and outputting the same as first rotor position information; a triangular wave generating step of, when the brushless motor is in a 180° conduction, detecting an output voltage of the sub coil, and generating a triangular wave signal synchronized with the output voltage; a rotor position detecting step based on a triangular wave signal of determining a rotor position of the brushless motor based on the triangular wave signal generated in the triangular wave generating step, and outputting the same as second rotor position information; and a motor control step of controlling the brushless motor based on information of the rotor stop position when activating the brushless motor, controlling the brushless motor based on the first rotor position information when in the 120° conduction, and controlling the brushless motor based on the second rotor position information when in the 180° conduction.

In the brushless motor control method including the above steps, in respective cases where the motor is in a stop state, where the motor is rotating at low rotation speed, and where the motor is rotating at high rotation speed, the rotor position detection method and brushless motor control methods are switched. In a case where the motor is in a stop state, a positive and negative direct current voltage are applied between two phase coils among the respective coils of U, V, and W phases, to thereby detect a position of the rotor in a stop state based on a current rise characteristic. When the motor is rotating at a low rotation speed, a 120° conduction is performed. When performing the 120° conduction, a non-conduction phase occurs in the respective phases of U, V, and W, and consequently, based on the zero-cross point of the voltage induced in this non-conduction phase, a rotor position is detected. Moreover, in a case where the motor is rotating at a high rotation speed, a 180° conduction is performed, and there is generated a triangular wave signal that is synchronized with the voltage induced in the sub coil provided in any one phase of the phases U, V, and W, and a rotor position is detected based on this triangular wave signal. Moreover, 1/3 voltage, 2/3 voltage, and 3/3 voltage where the peak value of this triangular wave signal is divided into three, are taken as switching points of stages (stages of phase voltage per 60° to be applied to the phase coils U, V, and W). Thereby, the stages of voltages to be applied to the coils of the respective phases U, V, and W are switched while detecting the rotor position.

Thus, in the brushless motor, it is possible, without implementing a Hall element in the respective phases U, V, and W, or implementing a magnet for position detection separately from the rotor, to reliably perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

A brushless motor control method according to a fourth aspect of the present invention is for a brushless motor control device that drives a brushless motor used as a starter motor of an engine, including a stator having coils of three phases U, V, and W and a neutral line, and a sub coil provided in any one phase of the phases U, V, and W, for detecting a voltage induced in the coil of the one phase, the brushless motor control device carries out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, and the brushless motor control method includes: a current rise detecting step of, when the brushless motor is in a stop state, sequentially selecting coils of two phases among the coils of the respective phases U, V, and W, applying positive and negative predetermined direct current voltages between the selected coils of the two phases, and detecting a value of the electric current flowing to the selected coils of the two phases; a rotor stop position detecting step of determining a rotor stop position of the brushless motor based on information of the value of the electric current flowing to the respective coils which is detected in the current rise detecting step; a zero-cross detecting step of, when the brushless motor is in a 120° conduction, detecting zero-cross points of the coils of the respective phases U, V, and W and generating zero-cross signals; a rotor position detecting step based on a zero-cross signal of determining a rotor position of the brushless motor based on the zero-cross signals of the coils of the respective phases U, V, and W generated in the zero-cross detecting step, and outputting the same as first rotor position information; a rotor position detecting step based on a measurement of time between zero-crosses of, when the brushless motor is in a 180° conduction, detecting an output voltage of the sub coil and detecting zero-crosses of the output voltage, measuring a time between adjacent zero-crosses of the detected output voltage, determining a rotor position of the brushless motor based on timing calculated from the measured time between the adjacent zero-crosses, and outputting the same as second rotor position information; and a motor control step of controlling the brushless motor based on information of the rotor stop position when activating the brushless motor, controlling the brushless motor based on the first rotor position information when in the 120° conduction, and controlling the brushless motor based on the second rotor position information when in the 180° conduction.

In the brushless motor control method including the above steps, in respective cases where the motor is in a stop state, where the motor is rotating at low rotation speed, and where the motor is rotating at high rotation speed, the rotor position detection method and brushless motor control methods are switched. In a case where the motor is in a stop state, a positive and negative direct current voltage are applied between two phase coils among the respective coils of U, V, and W phases, to thereby detect a position of the rotor in a stop state based on a current rise characteristic. When the motor is rotating at a low rotation speed, a 120° conduction is performed. When performing the 120° conduction, a non-conduction phase occurs in the respective phases of U, V, and W, and consequently, based on the signal of the zero-cross point of the voltage induced in this non-conduction phase, a rotor position is detected. Moreover, in a case where the motor is rotating at a high rotation speed, a 180° conduction is performed, zero-crosses of the voltage (output voltage of the sub coil) induced in the sub coil provided in any one phase of the phases U, V, and W, are detected, the time between the detected adjacent zero-crosses of the output voltage of the sub coil is measured, and the rotor position of the brushless motor is detected based on timing calculated from the measured time between the adjacent zero-crosses. Moreover, 1/3T, 2/3T, and 3/3T where this time T between the adjacent zero-crosses is divided into three, are taken as switching points of stages (stages of phase voltage per 60° to be applied to the phase coils U, V, and W). Thereby, the stages are switched while detecting the rotor position.

Thus, in the brushless motor, it becomes possible, without implementing a Hall element in the respective phases U, V, and W, or implementing a magnet for position detection separately from the rotor, to perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

EFFECT OF THE INVENTION

According to a brushless motor control device of the present invention, in a brushless motor, it becomes possible, without implementing a Hall element in respective phases U, V, and W, or implementing a magnet for position detection separately from a rotor, to perform an activation when a motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

REFERENCE SYMBOLS

Figure 1:
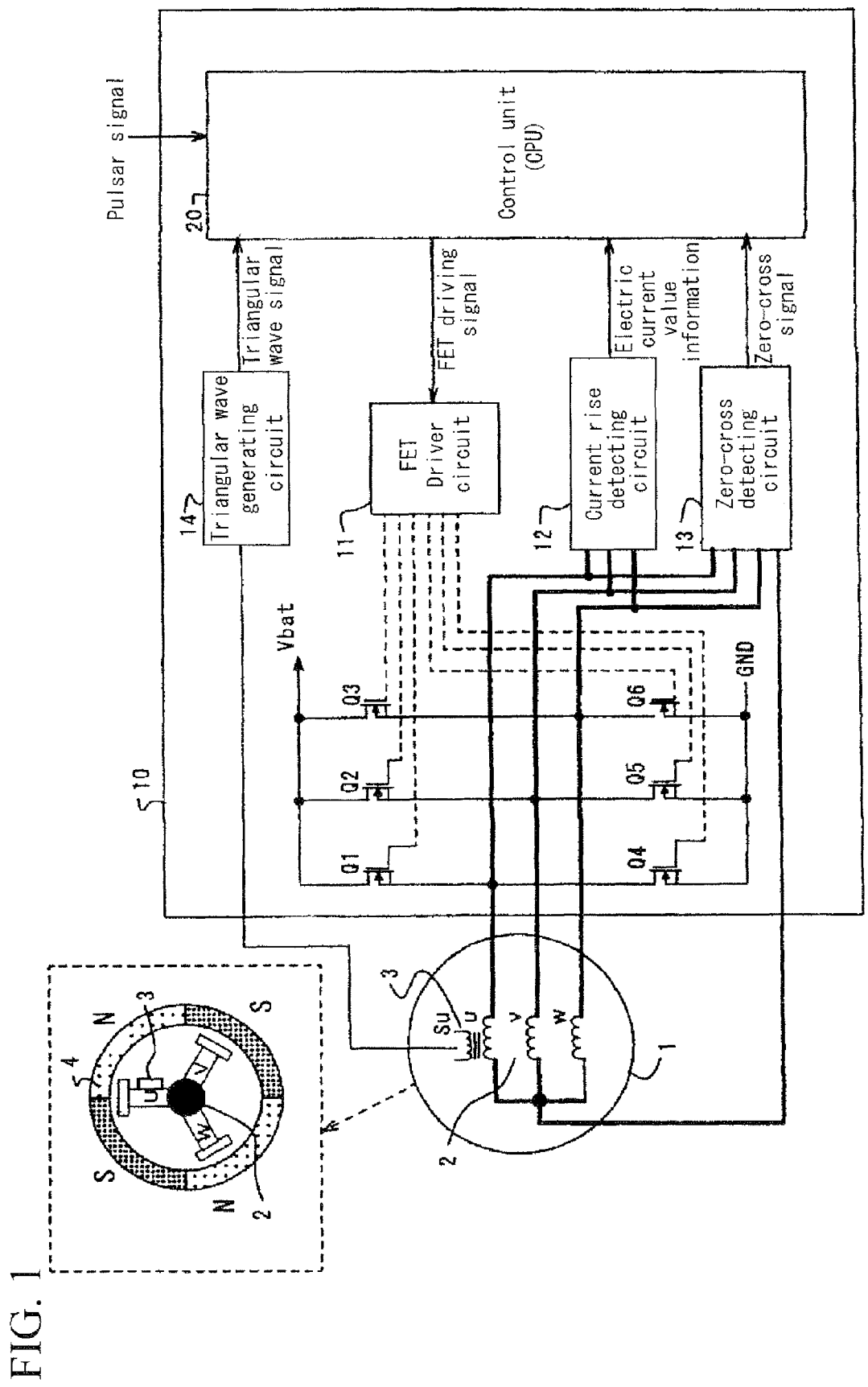
FIG. 1 shows a configuration of a brushless motor control device according to an embodiment of the present invention.

1 Brushless motor
2 Stator
3 Sub coil
4 Rotor
10 Brushless motor control device
11 FET driver circuit
12 Current rise detection circuit
13 Zero-cross detection circuit
14 Triangular wave generating circuit
20 Control unit
21 Rotor stop position detecting unit
22 Rotor position detecting unit based on zero-cross signal
23 Rotor position detecting unit based on triangular wave signal
24 Engine rotation speed calculating unit
25 Motor control unit
30 Rotor position information selecting unit
31 Rotor position information switching determination unit
32 Rotor position information matching unit
33 Rotor position information switching unit

BEST MODE FOR CARRYING OUT THE INVENTION

[Brief Overview]

In a brushless motor control device of the present invention, in respective cases where the motor is in a stop state, where the motor is rotating at low rotation speed, and where the motor is rotating at high rotation speed, the rotor position detection method and brushless motor control methods are switched.

In a case where the motor is in a stop state, a positive and negative direct current voltage are applied between two phase coils among the coils of respective phases U, V, and W, to thereby detect a rotor stop position based on current rise characteristic. In this case, electric current is caused to flow to the coils of respective phases U, V, and W at six timings. However, electric current patterns are switched at a higher speed compared to the normal driving timing so as not to cause the motor to rotate. From this drive current rise characteristic, the position of a rotor in the stop state is detected.

When activating the motor and when the motor is rotating at a low rotation speed, a 120° conduction is performed. When performing this 120° conduction, a non-conduction phase occurs in the respective phases of U, V, and W, and consequently, based on the zero-cross point of the voltage induced in this non-conduction phase, a rotor position is detected. The 120° conduction is performed when activating the motor and when the motor is rotating at a low speed, because it is possible to reliably perform normal rotation and reverse rotation of the motor although power output cannot be obtained as much compared to a 180° conduction. In particular, for a motorcycle, the nature thereof does not allow the motor to keep reverse-rotating. Thus, the rotational direction of the rotor can be stabilized. There is also a method in which a 180° conduction is performed right from the beginning. However, with this method, while an activating torque can be obtained, if the motor starts rotating in the reverse direction, then it may keep rotating in the reverse direction or may destroy driving elements due to over-current associated with overload in some cases. Therefore, the 180° conduction cannot be performed when starting the motor.

When the rotation of the motor is reaching a high rotation speed, the motor requires power. However, power cannot be obtained in the 120° conduction. Consequently, when the rotation reaches a high rotation speed, it is switched to the 180° conduction. The conduction method may be switched according to rotor rotation speed of the internal combustion engine (engine). Thus, it is possible to obtain a required power at a high rotation speed.

Incidentally, there occurs a new problem in which if it is switched to the 180° conduction, there will be no non-conduction phase and consequently the rotor position cannot be identified. Consequently, in the brushless motor control device of the present invention, in order to solve this problem, a sub coil is provided in any one of the phases U, V, and W. A triangular wave signal synchronized with this phase is generated, and 1/3 voltage, 2/3 voltage, and 3/3 voltage where the peak value of this triangular wave signal is divided into three, are taken as switching points of stages (stages of phase voltage per 60° to be applied to the respective phase coils U, V, and W of the motor).

Thereby, the stages are switched while detecting the rotor position based on the triangular wave signal.

As described above, in the brushless motor control device of the present invention, conduction methods are switched based on the state of the rotor, and it is thereby possible to start the engine reliably, stabilize the rotor rotation direction, and obtain power at a high rotation speed. Consequently, it is possible, in the drive control method of a sensorless type brushless motor in an internal combustion engine, to realize control the same as that in the drive control method of a brushless motor having a rotor sensor.

Hereunder, embodiments of the present invention are described, with reference to the drawings.

[Description of a Configuration of a Brushless Motor Control Device According to the Present Invention]

FIG. 1 shows a configuration of a brushless motor control device according to an embodiment of the present invention. In FIG. 1, the brushless motor control system includes a brushless motor 1 and a brushless motor control device 10. As shown in FIG. 1, the brushless motor control device 10 is a control device that drives the three phase brushless motor 1. The brushless motor 1 is a motor for a starter of an internal combustion engine, and is configured with; coils (coils wound on iron cores) of the respective phases U, V, and W, a stator 2 having a neutral line of the coil, and a rotor 4 comprising permanent magnets of four poles (two pairs of N pole and S pole).

Moreover, the U phase coil is provided with a sub coil (Su) 3 for detecting a voltage (sinusoidal wave voltage induced by the permanent magnet of the rotor) induced in the U phase coil. The sub coil 3 may be provided in another phase (V phase or W phase).

Inside the brushless motor control device 10 there is provided switching elements Q1 to Q6 configured with a three-phase bridge of a FET (field effect transistor). The brushless motor control device 10 includes the switching elements Q1 to Q6, a FET driver circuit 11, a current rise detecting circuit 12, a zero-cross detecting circuit 13, a triangular wave generating circuit 14, and a control unit 20.

The switching element Q1 is connected between the positive side voltage Vbat of a battery serving as a direct current power supply (not shown in the drawing) and the U phase coil of the brushless motor 1, the switching element Q2 is connected between the positive side voltage Vbat of the battery and the V phase coil, and the switching element Q3 is connected between the positive side voltage Vbat of the battery and the W phase coil.

Moreover, the switching element Q4 is connected between the U phase coil of the brushless motor 1 and the GND of the battery, the switching element Q5 is connected between the V phase coil and the GND of the battery, and the switching element Q6 is connected between the W phase coil and the GND of the battery.

These switching elements Q1 to Q6 are driven by a gate driving signal output from the FET driver circuit 11. This gate signal is generated in the FET driver circuit 11 based on a FET driving signal output from the control unit (control unit configured with a CPU or the like) 20.

The current rise detecting circuit 12 is a circuit that detects an electric current signal for detecting a rotor stop position in a case where the brushless motor 1 is in a stop state, and information of the detected electric current value is transmitted to the control unit 20.

The zero-cross detecting circuit 13 is a circuit for detecting a zero-cross point from a voltage (non-conduction phase voltage) induced in the coils of the respective phases U, V, and W of the brushless motor 1 in a case where the brushless motor 1 is rotating at low rotation speed, and information of the detected zero-cross point is transmitted as a zero-cross signal to the control unit 20.

The triangular wave generating unit 14 is a circuit for generating a triangular wave signal synchronized with the induced voltage of the U phase coil, based on a signal from the subcoil (Su) 3 that is attached to the U phase coil of the brushless motor 1. The triangular wave signal generated in the triangular wave generating unit 14 is sent to the control unit 20.

Figure 2:
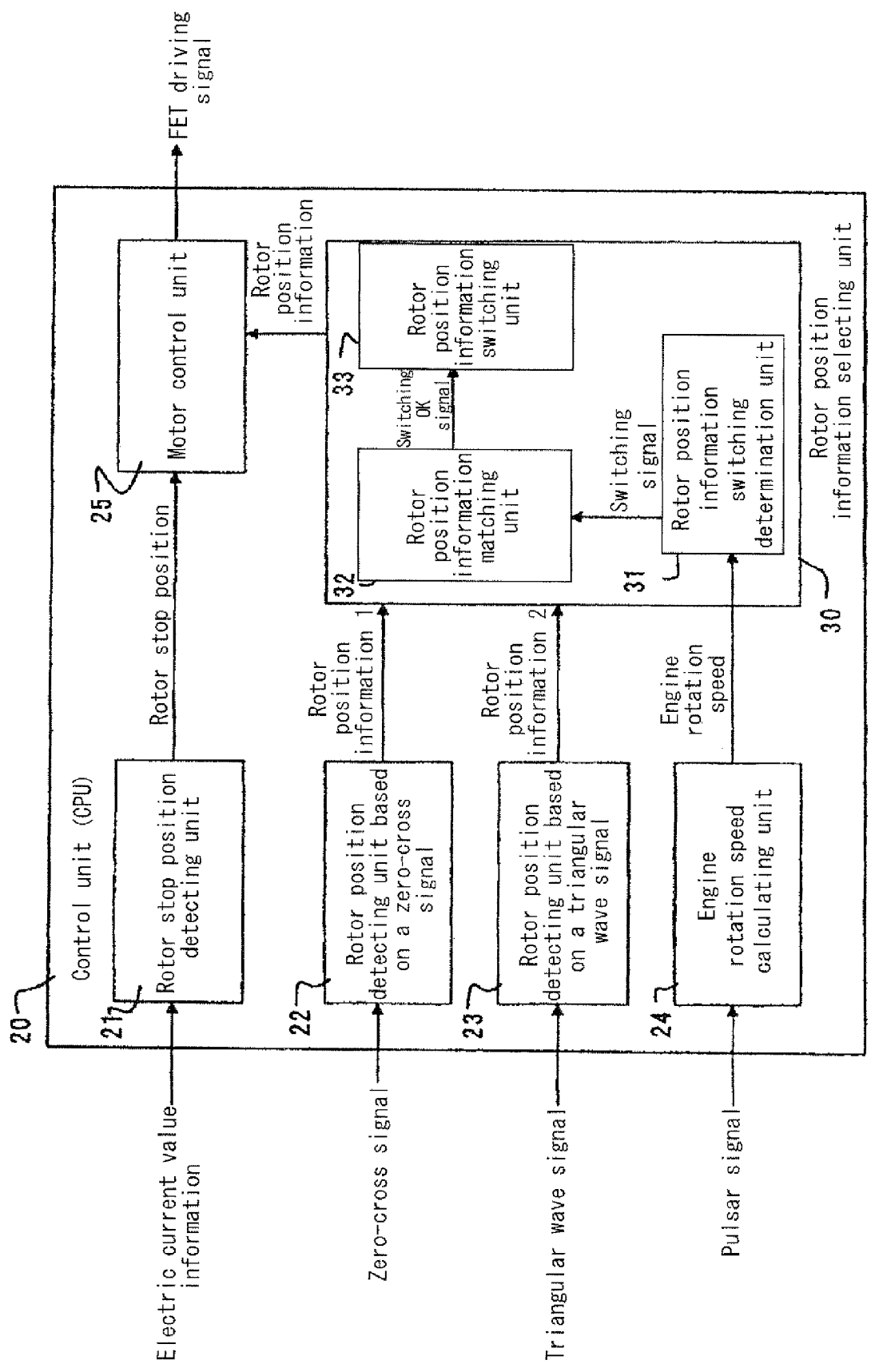
FIG. 2 shows a configuration of a control unit in the brushless motor control device shown in FIG. 1.

FIG. 2 shows a configuration of the control unit 20. This control unit 20 is configured by including hardware such as, a CPU (micro computer or micro controller), a ROM, a RAM, an A/D converter, and a D/A converter.

A rotor stop position detecting unit 21 in the control unit 20 receives an electric current signal from the current rise detecting circuit 12, and based on this electric current signal, performs processing for detecting a rotor stop position when the motor is in a stop state. The information of the rotor stop position detected by the rotor stop position detecting unit 21 is transmitted to a motor control unit 25. The method in the rotor stop position detecting unit 21 for detecting a rotor stop position is described later.

A rotor position detecting unit 22 based on a zero-cross signal, receives information of the zero-cross point detected in the zero-cross detecting circuit 13, and based on this zero-cross point information, performs processing for detecting a rotor position in a case where the motor is rotating at a low rotation speed. The information of the rotor position detected in the rotor position detecting unit 22 based on a zero-cross signal, is transmitted as rotor position information 1 (first rotor position information) to a rotor position information selecting unit 30. The method, in the rotor position detecting unit 22 based on a zero-cross signal, for detecting a rotor position is described later.

A rotor position detecting unit 23 based on a triangular wave signal receives the triangular wave signal generated in the triangular wave generating unit 14, and based on this triangular wave signal, performs processing for detecting a rotor position. The rotor position information detected in the rotor position detecting unit 23 based on a triangular wave signal, is transmitted as rotor position information 2 (second rotor position information) to the rotor position information selecting unit 30. The method, in the rotor position detecting unit 23 based on a triangular wave signal, for detecting a rotor position is described later.

An engine rotation speed calculating unit 24 is a processing unit that calculates engine rotation speed based on pulsar signals transmitted from the engine side.

The rotor position information selecting unit 30 is configured with a rotor position information switching determination unit 31, a rotor position information matching unit 32, and a rotor position information switching unit 33.

The rotor position information switching determination unit 31 is a processing unit that, based on the engine rotation speed information received from the engine rotation speed calculating unit 24, judges (determines) which one of the rotor position information 1 and the rotor position information 2 is to be selected. In this rotor position information switching determination unit 31, in a case where it is determined that rotor position information is to be switched, a switching signal is transmitted to the rotor position information matching unit 32.

In the rotor position information matching unit 32, in a case where the switching signal of the rotor position information is received from the rotor position information switching determination unit 31, it is determined whether or not this rotor position information switching has matching, and if it is determined there is a matching, a switching OK signal will be transmitted to the rotor position information switching unit 33. The rotor position information switching unit 33, based on the switching OK signal received from the rotor position information matching unit 32, switches between the rotor position information 1 and the rotor position information 2 and transmits the rotor position information to the motor control unit 25.

In the motor control unit 25, based on information of the rotor stop position received from the rotor stop position detecting unit 21 and on the rotor position information (rotor position information 1 or rotor position information 2) received from the rotor position detecting unit 30 based on a zero-cross signal, a FET driving signal for driving the switching elements (FET) Q1 to Q6 is generated, to thereby control the voltage to be applied to the coils of the respective phases U, V, and W of the brushless motor 1.

The aforementioned current rise detecting circuit in the present invention corresponds to the current rise detecting circuit 12. The rotor stop position detecting unit corresponds to the rotor stop position detecting unit 21. The zero-cross detecting circuit corresponds to the zero-cross detecting circuit 13. The rotor position detecting unit based on a zero-cross signal corresponds to the rotor position detecting unit 22 based on a zero-cross signal. The triangular wave generating circuit corresponds to the triangular wave generating circuit 14. The rotor position detecting unit based on a triangular wave signal corresponds to the rotor position detecting unit 23 based on a triangular wave signal. The motor control unit corresponds to the motor control unit 25. The engine rotation speed calculating unit corresponds to the engine rotation speed calculating unit 24. The rotor position information switching determination unit corresponds to the rotor position information switching determination unit 31. The rotor position information matching unit corresponds to the rotor position information matching unit 32. The rotor position information switching unit corresponds to the rotor position information switching unit 33.

[Description of Method of Detecting Rotor Stop Position when Motor is Stopped]

Here there is described a method of detecting the rotor stop position when the motor is stopped, that is performed by the current rise detecting circuit 12 and the rotor stop position detecting unit 21. The method itself is a well known general method.

FIG. 5 to FIG. 10 are diagrams for describing a rotor stop position detection control method based on electric current patterns.

Figure 5A:
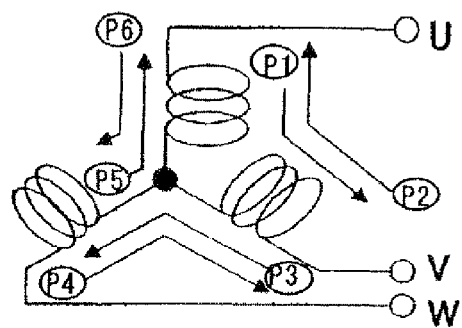
FIG. 5A shows a rotor stop position detection control method (1) based on electric current patterns.
Figure 5B:
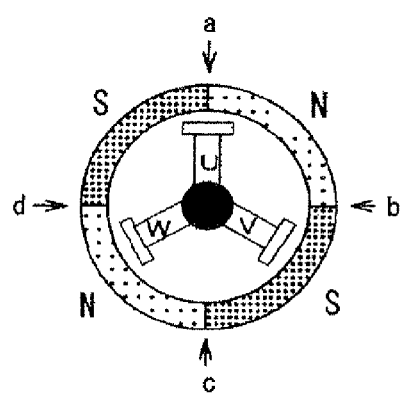
FIG. 5B shows the rotor stop position detection control method (1) based on electric current patterns.
Figure 5C:
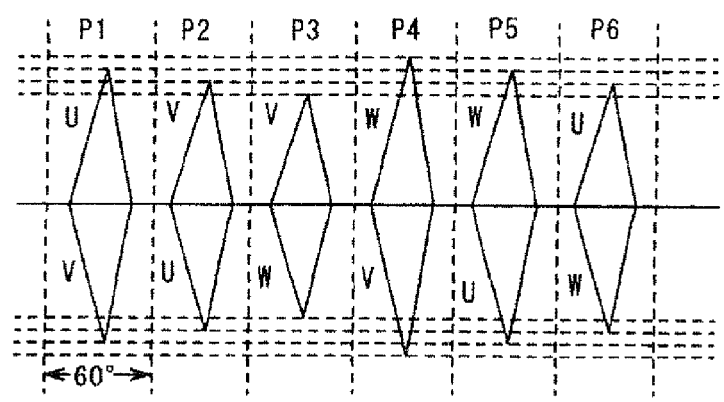
FIG. 5C shows the rotor stop position detection control method (1) based on electric current patterns.

FIG. 5A to FIG. 5C show a rotor stop position detection control method (1) based on electric current patterns. In order to detect a rotor stop position based on the electric current patterns, as shown in FIG. 5A, in the order shown with (P1) to (P6), a direct current voltage is applied to perform conduction only for a short period of time so as not to drive the motor, and a rotor stop position is detected based on the patterns of the electric current flowing to the coils of the respective phases U, V, and W.

This detection is such that, when an electric current is caused to flow into the coils of the respective phases wound on the stator, then under the influence of the magnetic field that occurs on the stator side and the magnetic field associated with the permanent magnet on the rotor side, whether the stator side magnetic field (and consequently electric current) acts in a direction of increasing, or whether the magnetic field acts in a direction of being canceled and reduced, is changed due to the positional relationship between the rotor and stator, and a rotor stop position is thereby detected.

FIG. 5B shows a state where, in a brushless motor with four poles (two pairs of N and S poles) of rotor side permanent magnets and coils of the respective phases U, V, and W wound on the stator side, the rotor side mid-point "a" (boundary point between the N and S poles) matches with the coils axis of the U phase coil. In FIG. 5B, reference symbols "a" to "d" denote mid-points.

In the state of the rotor stop position shown in FIG. 5B, if an electric current flows in the patterns of P1 to P6, the electric current pattern shown in FIG. 5C is obtained. In this example, the highest level of the electric current flows in the pattern. P4

(where a voltage is applied between the phases W and V so that the W phase has a positive potential), and the lowest level of the electric current flows in the pattern P3 (where a voltage is applied between the phases V and W so that the V phase has a positive potential). In this manner, based on the patterns P1 to P6 of the electric current flowing to the coils of the respective phases U, V, and W, the rotor stop position can be determined to be in the state of FIG. 5B.

Figure 6A:
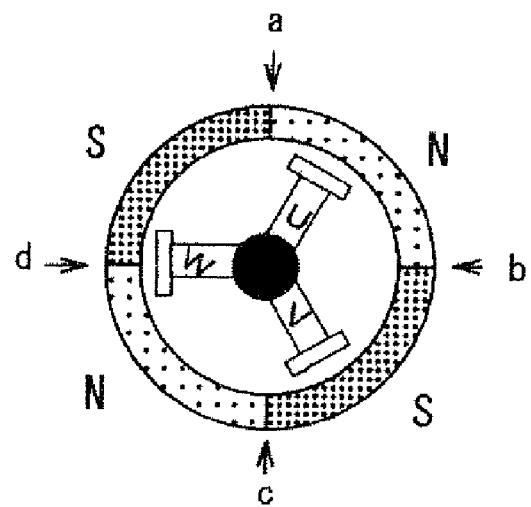
FIG. 6A shows a rotor stop position detection control method (2) based on electric current patterns.
Figure 6B:
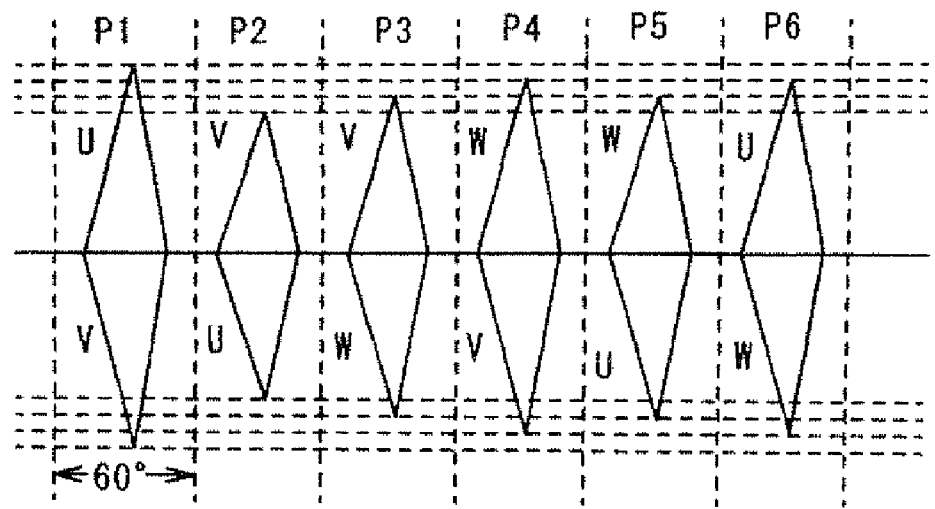
FIG. 6B shows the rotor stop position detection control method (2) based on electric current patterns.

FIG. 6A and FIG. 6B show a rotor stop position detection control method (2) based on electric current patterns. FIG. 6A shows a state where the rotor side mid-point "d" matches with the coil axis of the W phase coil. In FIG. 6A, reference symbols "a" to "d" denote mid-points.

In the state of the rotor stop position shown in FIG. 6A, if an electric current flows in the patterns of P1 to P6, the electric current pattern shown in FIG. 6B is obtained. In this example, the highest level of the electric current flows in the pattern P1 (where a voltage is applied between the phases U and V so that the U phase has a positive potential), and the lowest level of the electric current flows in the pattern P2 (where a voltage is applied between the phases U and V so that the V phase has a positive potential). In this manner, based on the patterns P1 to P6 of the electric current flowing to the coils of the respective phases U, V, and W, the rotor stop position can be determined to be in the state of FIG. 6A.

Figure 7A:
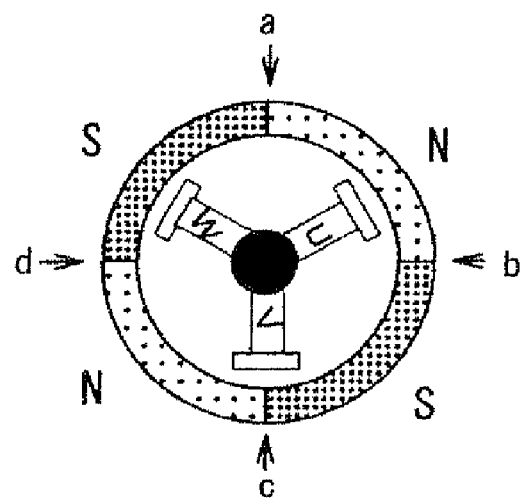
FIG. 7A shows a rotor stop position detection control method (3) based on electric current patterns.
Figure 7B:
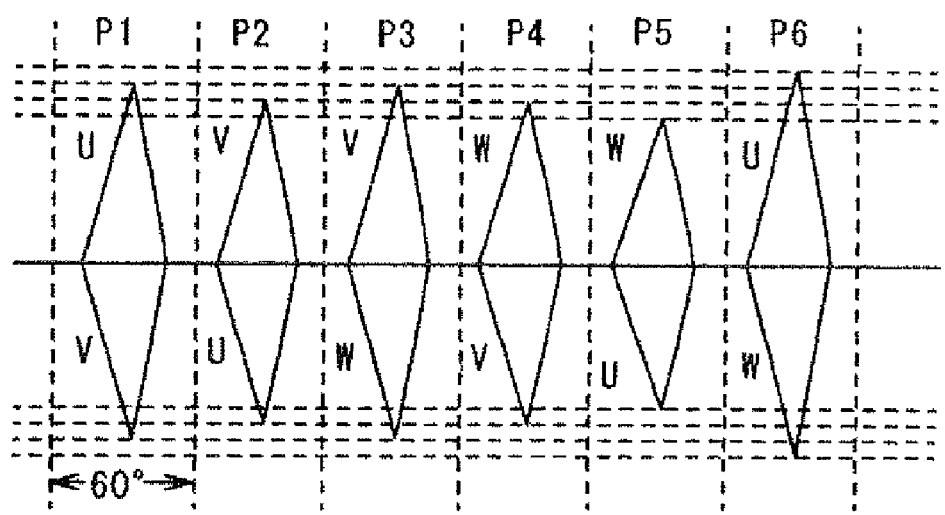
FIG. 7B shows the rotor stop position detection control method (3) based on electric current patterns.

FIG. 7A and FIG. 7B show a rotor stop position detection control method (3) based on electric current patterns. FIG. 7A shows a state where the rotor side mid-point "c" matches with the coil axis of the V phase coil. In FIG. 7A, reference symbols "a" to "d" denote mid-points.

In the state of the rotor stop position shown in FIG. 7A, if an electric current flows in the patterns of P1 to P6, the electric current pattern shown in FIG. 7B is obtained. In this example, the highest level of the electric current flows in the pattern P6 (where a voltage is applied between the phases U and W so that the U phase has a positive potential), and the lowest level of the electric current flows in the pattern P5 (where a voltage is applied between the phases W and U so that the W phase has a positive potential). In this manner, based on the patterns P1 to P6 of the electric current flowing to the coils of the respective phases U, V, and W, the rotor stop position can be determined to be in the state of FIG. 7A.

Figure 8A:
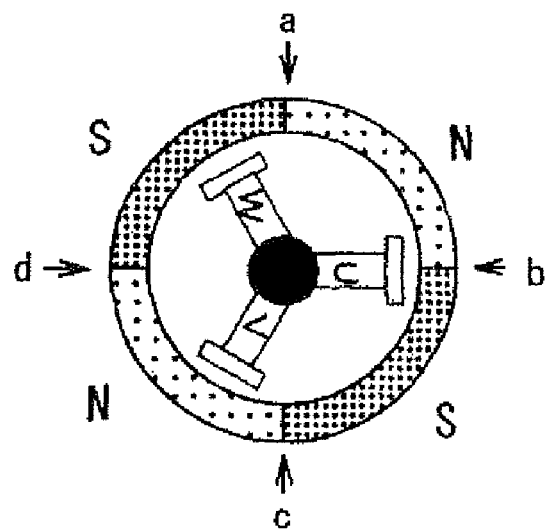
FIG. 8A shows a rotor stop position detection control method (4) based on electric current patterns.
Figure 8B:
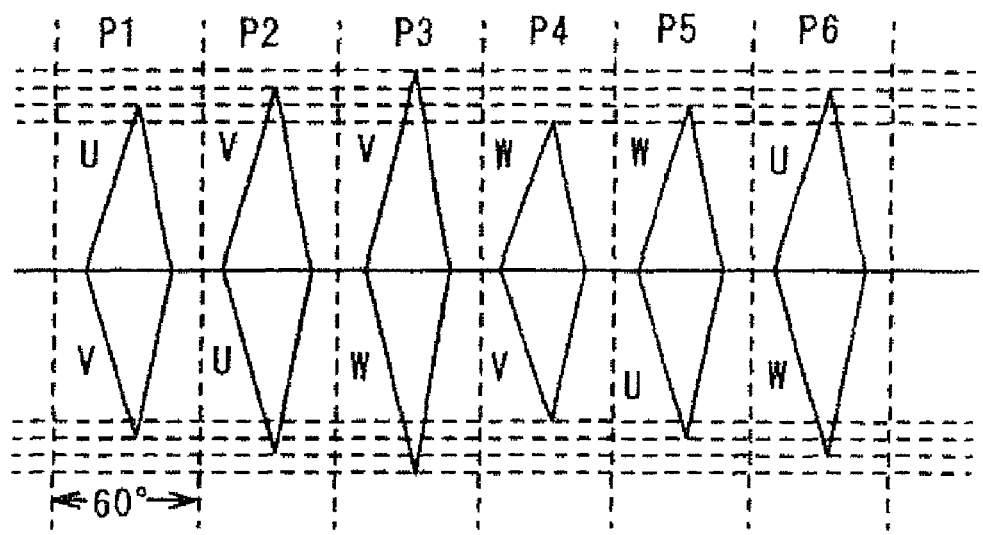
FIG. 8B shows the rotor stop position detection control method (4) based on electric current patterns.

FIG. 8A and FIG. 8B show a rotor stop position detection control method (4) based on electric current patterns. FIG. 8A shows a state where the rotor side mid-point "b" matches with the coil axis of the U phase coil. In FIG. 8A, reference symbols "a" to "d" denote mid-points.

In the state of the rotor stop position shown in FIG. 8A, if an electric current flows in the patterns of P1 to P6, the electric current pattern shown in FIG. 8B is obtained. In this example, the highest level of the electric current flows in the pattern P3 (where a voltage is applied between the phases V and W so that the V phase has a positive potential), and the lowest level of the electric current flows in the pattern P4 (where a voltage is applied between the phases W and V so that the W phase has a positive potential). In this manner, based on the patterns P1 to P6 of the electric current flowing to the coils of the respective phases U, V, and W, the rotor stop position can be determined to be in the state of FIG. 8A.

Figure 9A:
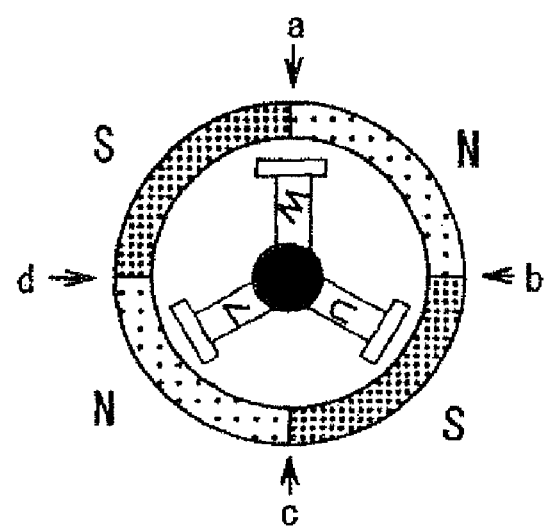
FIG. 9A shows a rotor stop position detection control method (5) based on electric current patterns.
Figure 9B:
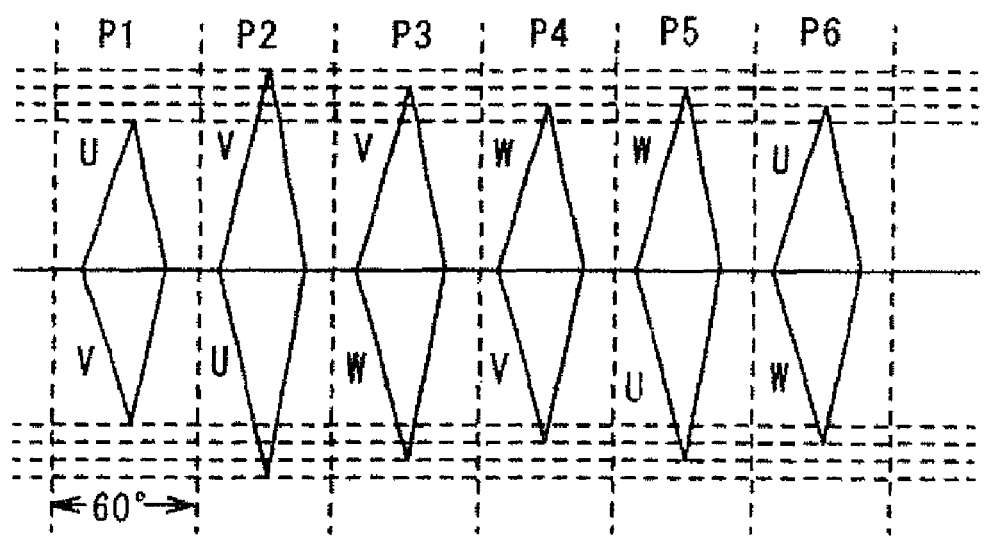
FIG. 9B shows the rotor stop position detection control method (5) based on electric current patterns.

FIG. 9A and FIG. 9B show a rotor stop position detection control method (5) based on electric current patterns. FIG. 9A shows a state where the rotor side mid-point "a" matches with the coil axis of the W phase coil. In FIG. 9A, reference symbols "a" to "d" denote mid-points.

In the state of the rotor stop position shown in FIG. 9A, if an electric current flows in the patterns of P1 to P6, the electric current pattern shown in FIG. 9B is obtained. In this example, the highest level of the electric current flows in the pattern P2 (where a voltage is applied between the phases V and U so that the V phase has a positive potential), and the lowest level of the electric current flows in the pattern P1 (where a voltage is applied between the phases U and V so that the U phase has a positive potential). In this manner, based on the patterns P1 to P6 of the electric current flowing to the coils of the respective phases U, V, and W, the rotor stop position can be determined to be in the state of FIG. 9A.

Figure 10A:
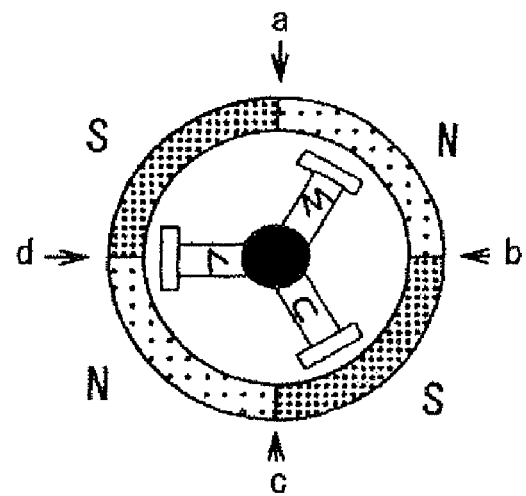
FIG. 10A shows a rotor stop position detection control method (6) based on electric current patterns.
Figure 10B:
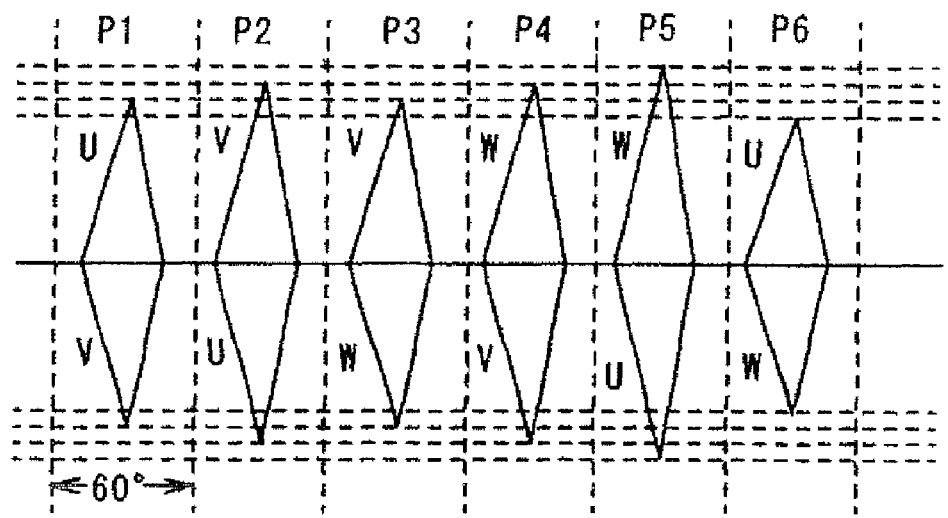
FIG. 10B shows the rotor stop position detection control method (6) based on electric current patterns.

FIG. 10A and FIG. 10B show a rotor stop position detection control method (6) based on electric current patterns. FIG. 10A shows a state where the rotor side mid-point "d" matches with the coil axis of the V phase coil. In FIG. 10A, reference symbols "a" to "d" denote mid-points.

In the state of the rotor stop position shown in FIG. 10A, if an electric current flows in the patterns of P1 to P6, the electric current pattern shown in FIG. 10B is obtained. In this example, the highest level of the electric current flows in the pattern P5 (where a voltage is applied between the phases W and U so that the W phase has a positive potential), and the lowest level of the electric current flows in the pattern P6 (where a voltage is applied between the phases W and U so that the U phase has a positive potential). In this manner, with the patterns P1 to P6 of the electric current flowing to the coils of the respective phases U, V, and W, the rotor stop position can be determined to be in the state of FIG. 10A.

[Description of Rotor Position Detection Method when Motor is Rotating at Low Rotation Speed]

Next, there is described a method for detecting a rotor position when the motor is rotating at a low rotation speed. This method is a widely known general method, and is only briefly described below.

Figure 11:
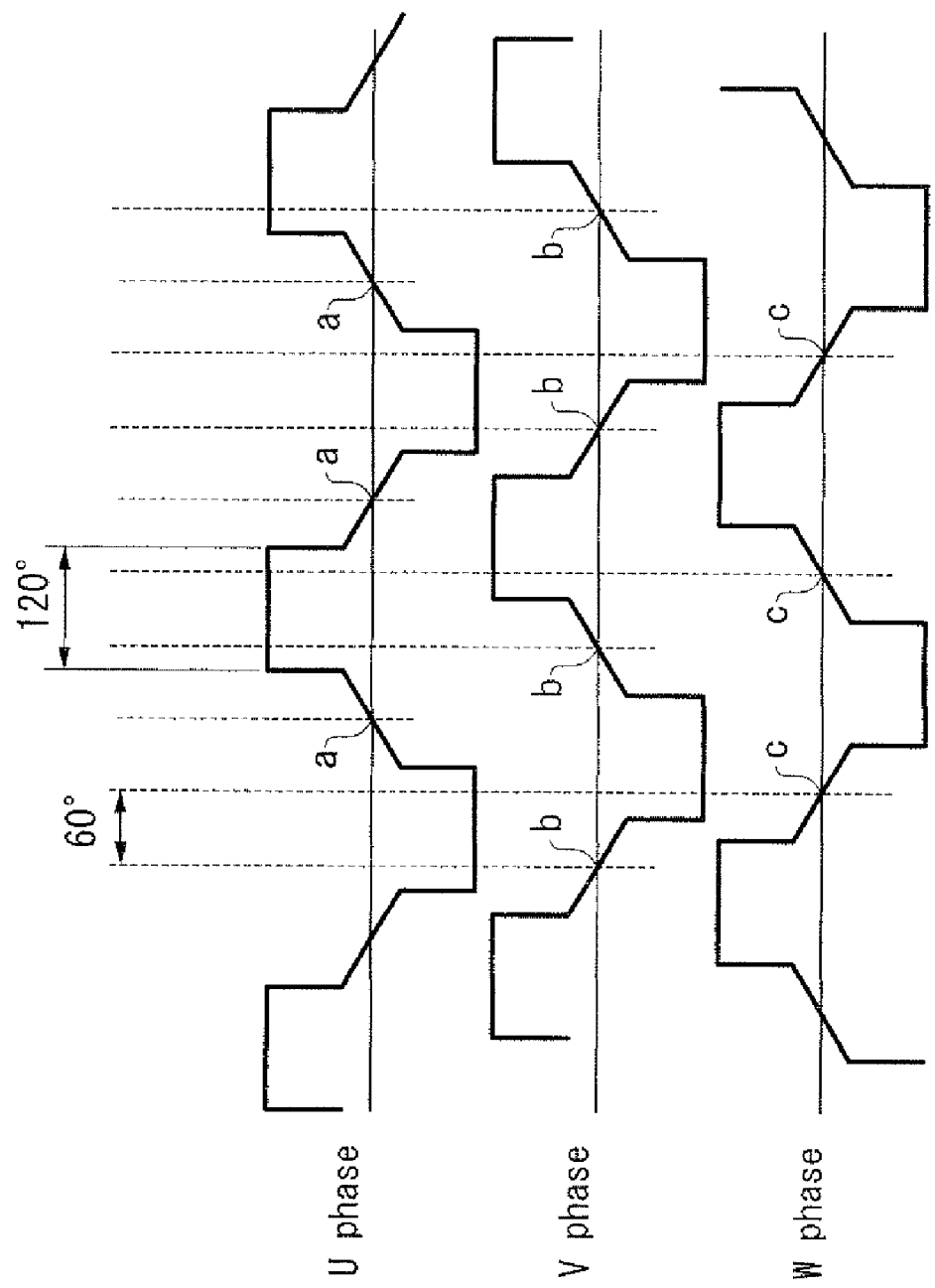
FIG. 11 shows phase voltage waveforms of U, V, and W phases in a 120° conduction method.

When the motor is rotating at a low rotation speed, the motor is driven based on the 120° conduction method. In this 120° conduction method, as shown in the phase voltage waveforms of U, V, and W in FIG. 11, electric power is conducted only during the period of 120° of the entire period of 180°. Therefore, a non-conduction phase occurs in the respective phases of U, V, and W, and it is possible to detect the rotor position by detecting the zero-cross points "a", "b", and "c" of this non-conduction phase.

[Description of Rotor Position Detection Method when Motor is Rotating at High Rotation Speed]

When the motor is rotating at a high rotation speed, a 180° conduction is performed in order to obtain sufficient motor power. Consequently, it becomes impossible to detect a zero-cross point of a non-conduction phase as with the case of the 120° conduction. Therefore, in any one phase of the phases U, V, and W, there is provided a sub coil.

In a case where the sub coil is provided in the U phase, an induction voltage of the U phase (sinusoidal voltage induced due to motor rotation) occurs in the sub coil. Based on the zero-cross point of this voltage induced in the sub coil, it is possible to determine that the position of the sub coil has matched the mid point of the magnetic poles of the stator (boundary point between N and S poles).

A triangular wave, the peak value of which does not change, synchronized with the voltage induced in the sub coil, is generated, and 1/3 voltage, 2/3 voltage, and 3/3 voltage where the peak value of this triangular wave signal is divided into three, are taken as switching points of stages (stages of phase voltage per 60° to be applied to the phase coils U, V, and W). Thereby, the stages are switched while detecting the rotor position based on the triangular wave signal.

Next, a method for generating this triangular wave signal is described.

The rotation speed of the brushless motor does not change rapidly in general, and therefore, the induction voltage of the sub coil can be considered such that the waveform of the present cycle is substantially the same as the waveform one cycle before. For example, as shown in FIG. 12, where the wave form WF2 is taken as the waveform of the present cycle, the half cycle T2 of the waveform WF2 is substantially the same as the half cycle T1 of the waveform 1 one cycle therebefore.

Utilizing the above characteristic, a triangular wave voltage VB is generated in the following procedures.

Figure 12:
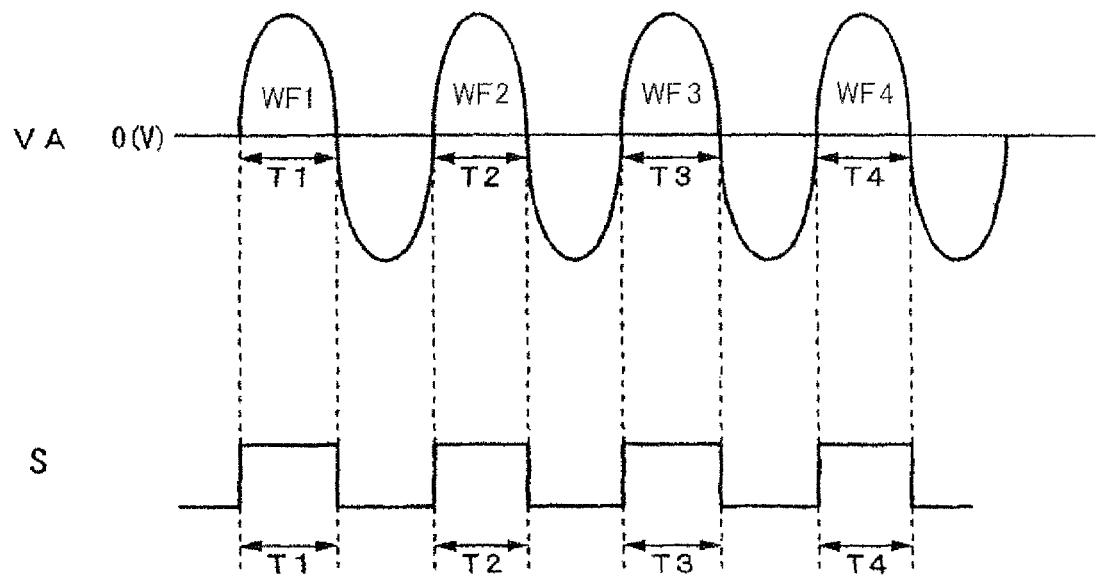
FIG. 12 shows rectangular waves synchronized with alternating voltage waveforms of the U phase.

(Procedure 1) As shown in FIG. 12, in the cycle of waveform WF1, a rectangular wave S is generated from an alternating voltage VA induced in the sub coil. The half cycle of the rectangular wave S corresponding to this waveform WF1 matches the half cycle T1 of the alternating voltage VA in the cycle of the waveform WF1.

(Procedure 2) Subsequently, the time of the half cycle T1 of the rectangular wave S is counted.

Figure 13:
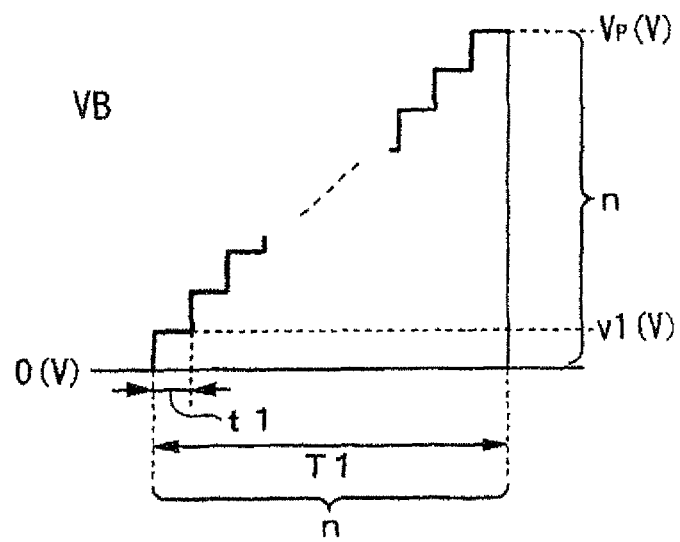
FIG. 13 is a diagram for describing a mechanism of generating a triangular wave signal.

(Procedure 3) Then, as shown in FIG. 13, the count number of the time of the half cycle T1 is divided by a predetermined resolution n, and a time t1 (=T1/n) is obtained as a result. Here, the resolution n is an amount that defines smoothness of the slope of the triangular wave voltage VB, and the slope of the triangular wave voltage VB becomes smoother with a higher resolution 11.

(Procedure 4) Next, a peak voltage Vp of the triangular wave voltage VB is divided by the predetermined resolution n, and a voltage v1 (=Vp/n) is obtained as a result.

(Procedure 5) Subsequently, at the rising timing of the waveform WF2 in the next cycle (at the timing where count of T2 starts), the triangular wave voltage VB is raised only by the above voltage v1, and this triangular wave voltage VB is maintained only for the above period of time t1.

(Procedure 6) In the cycle of the same waveform WF2, the triangular wave voltage VB is further raised only by the above voltage v1 at the timing where the above time t1 has elapsed, and if this is repeated n times in total, a staircase-shaped waveform shown in FIG. 13 is obtained, and a staircase-shaped waveform that corresponds to the slope portion of the triangular wave voltage corresponding to the waveform WF2, is obtained. If the value of the resolution n is made greater, the staircase-shaped waveform becomes smoother, and a further excellent triangular wave can be obtained.

Through the above procedures, with use of the waveform of the alternating voltage VA one cycle before, it is possible to generate a triangular wave, the triangular wave voltage of which corresponds to each cycle of the alternating voltage VA and the peak voltage Vp of which is constant. Moreover, it is possible to detect a rotor position based on this triangular wave. That is to say, the region from the start point to the peak point of the triangular wave signal corresponds to the region from the mid-point of the rotor (boundary point between N pole and S pole) to the next mid-point.

This rotor position detection based on a sub coil can be utilized not only in the case of a 180° conduction but also in a 120° conduction (when the motor is rotating at a low rotation speed), and in the 120° conduction, it can be used with the rotor position detection based on zero-cross detection.

Figure 14:
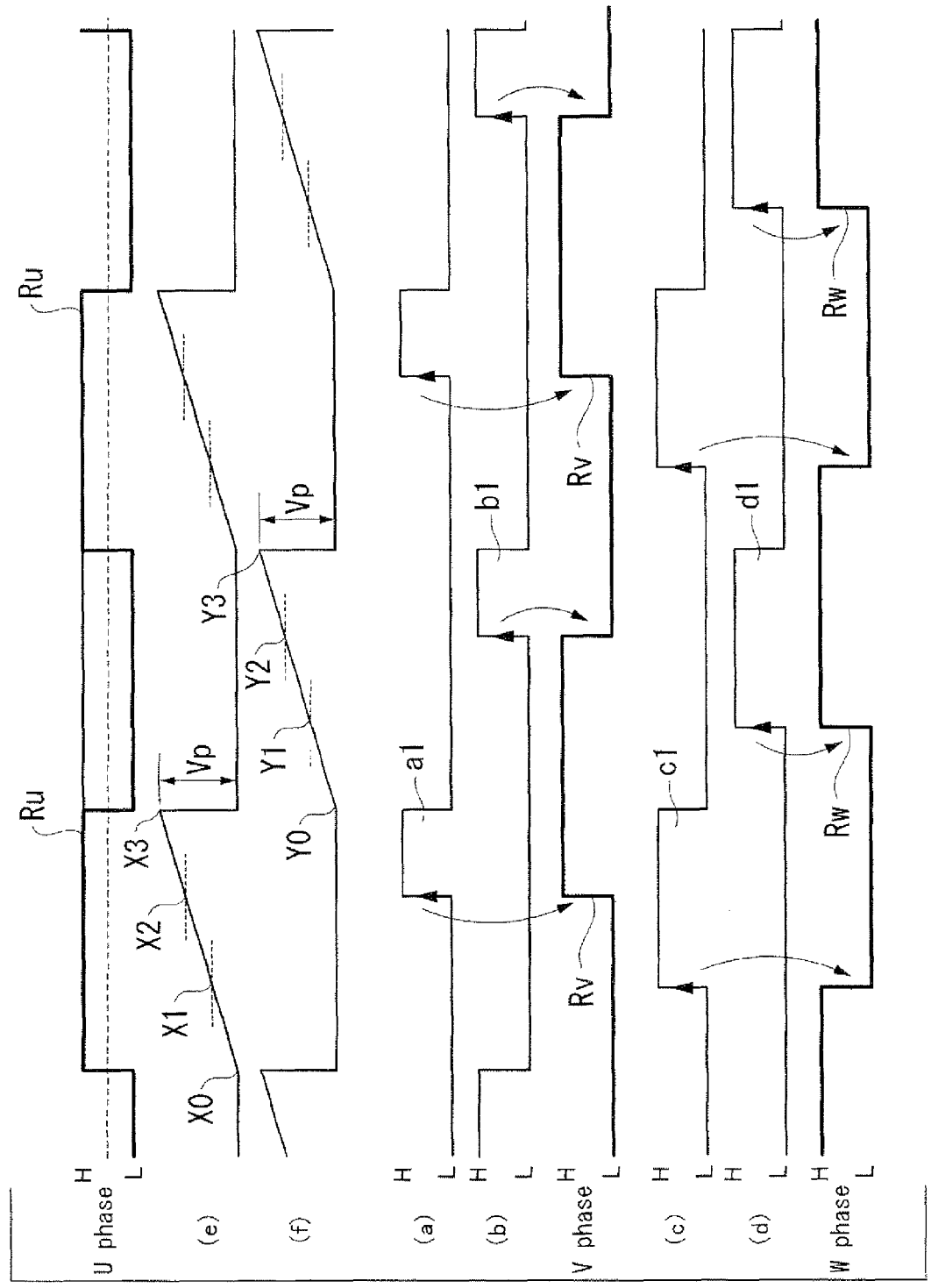
FIG. 14 is a diagram for describing a mechanism of generating rectangular waves of the phases U, V, and W.

FIG. 14 is a diagram for describing a method for generating a rectangular wave Rv of the V phase and a rectangular wave Rw of the W phase, from a rectangular wave Ru synchronized with the U phase. These rectangular waves Ru, Rv, and Rw, in the 180° conduction, are utilized for switching stages of phase voltages to be applied to the coils of the respective phases U, V, and W. Hereunder, the procedures thereof are described with reference to FIG. 14.

(Procedure 1) First, a rectangular wave Ru synchronized with the U phase is generated from the detected voltage of a sub coil Su. Then, a triangular wave (e) synchronized with the "H (high)" side of this rectangular wave Ru, is generated. This triangular wave (e) is synchronized with the rectangular wave Ru, and the phase width thereof is 180° (0° to 180°). Moreover, this triangular wave (e) is a triangular wave the height of which (the peak voltage Vp of the triangular wave) is equal regardless of the pulse width of the rectangular wave Ru (refer to FIG. 12 and FIG. 13).

(Procedure 2) Similarly, a triangular wave (f) synchronized with the "L (low)" side of the rectangular wave Ru, is generated. This triangular wave (f) is synchronized with the rectangular wave Ru, and the phase width thereof is 180° (180° to 360°). Moreover, this triangular wave (f) is also a triangular wave the height of which (the peak voltage Vp of the triangular wave) is equal regardless of the pulse width of the rectangular wave Ru (refer to FIG. 12 and FIG. 13).

(Procedure 3) Next, point X1 at 1/3 height and point X2 at 2/3 height of the peak voltage Vp of the triangular wave (e) are found. Consequently, the phase widths between point X0 (rising point of the triangular wave (e)) and point X1, between point X1 and point X2, and between point X2 and point X3 (falling point of the triangular wave (e)), are respectively 60°. Similarly, point Y1 at 1/3 height and point Y2 at 2/3 height of the peak voltage Vp of the triangular wave (f) are found.

(Procedure 4) Next, there is generated a pulse a1 in which a region of which between the point X2 and point X3 is "H", and there is generated a pulse b1 a region of which between the point Y2 and point Y3 (falling point of the triangular wave (f)) is "H".

(Procedure 5) There is generated a rectangular wave Rv that becomes "H" at the rising edge of the pulse a1 and that returns to "L" at the rising edge of the pulse b1, and this is taken as a rectangular wave synchronized with the V phase.

(Procedure 6) Next, there is generated a pulse c1 a region of which between the point X1 and point X3 is "H", and there is generated a pulse d1 a region of which between the point Y1 and point Y3 is "H".

(Procedure 7) There is generated a rectangular wave Rw that becomes "H" at the rising edge of the pulse d1 and that returns to 0 at the rising edge of the pulse e1, and this is taken as a rectangular wave synchronized with the W phase.

Through the above procedures, it is possible to generate the rectangular wave Rv of the V phase with a 120° phase delay with respect to the U phase, and the rectangular wave Rw of the W phase with a 240° phase delay with respect to the U phase.

Therefore it is possible, with only a single sub coil, to generate rectangular wave signals that are synchronized with the U phase, V phase, and W phase, and it is consequently possible to utilize this for conduction timing control in a case where the motor is rotating at a high rotation speed.

[Description of Sensorless Control Flow]

Next, there is described a flow of sensorless control processing in the brushless motor control device of the present invention.

Figure 3:
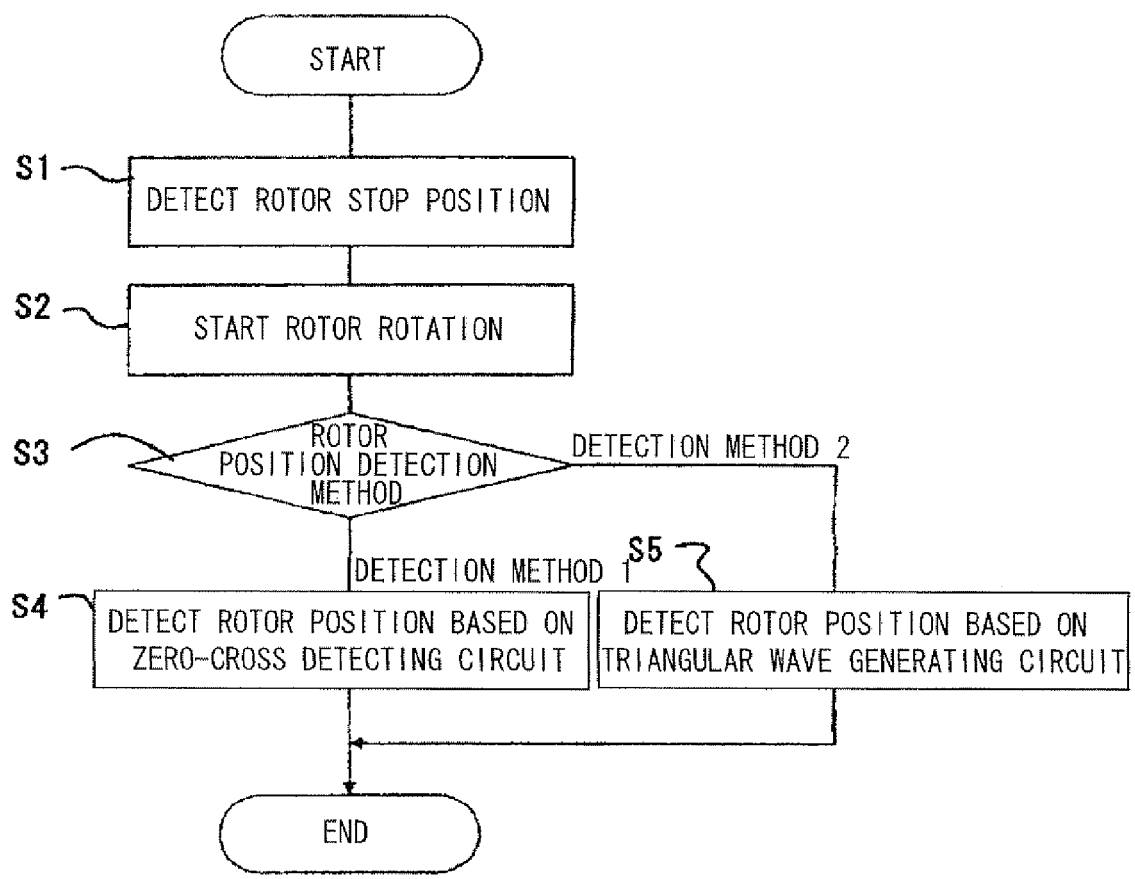
FIG. 3 is a flow chart showing a flow of sensorless control processing.

FIG. 3 is a flow chart showing a flow of the sensor less control processing. Hereunder, there is described a flow of the processing, with reference to the flow chart of FIG. 3.

When activating the brushless motor, a rotor stop position is first detected, and a voltage is applied to the coil of the respective phases U, V, and W so as to match the rotation direction (step S1). When the brushless motor has started rotation (step S2), a determination of the rotor position detection method is performed (step S3). The detail of the determination processing in this step S3 is described later. In this step S3, if it is determined that detection method 1 is to be used, there is performed a rotor position detection based on the zero-cross detecting circuit (step S4). Moreover, in step S3, if it is determined that the detection method 2 is to be used, there is performed a rotor position detection based on the triangular wave generating circuit (step S5).

Figure 4:
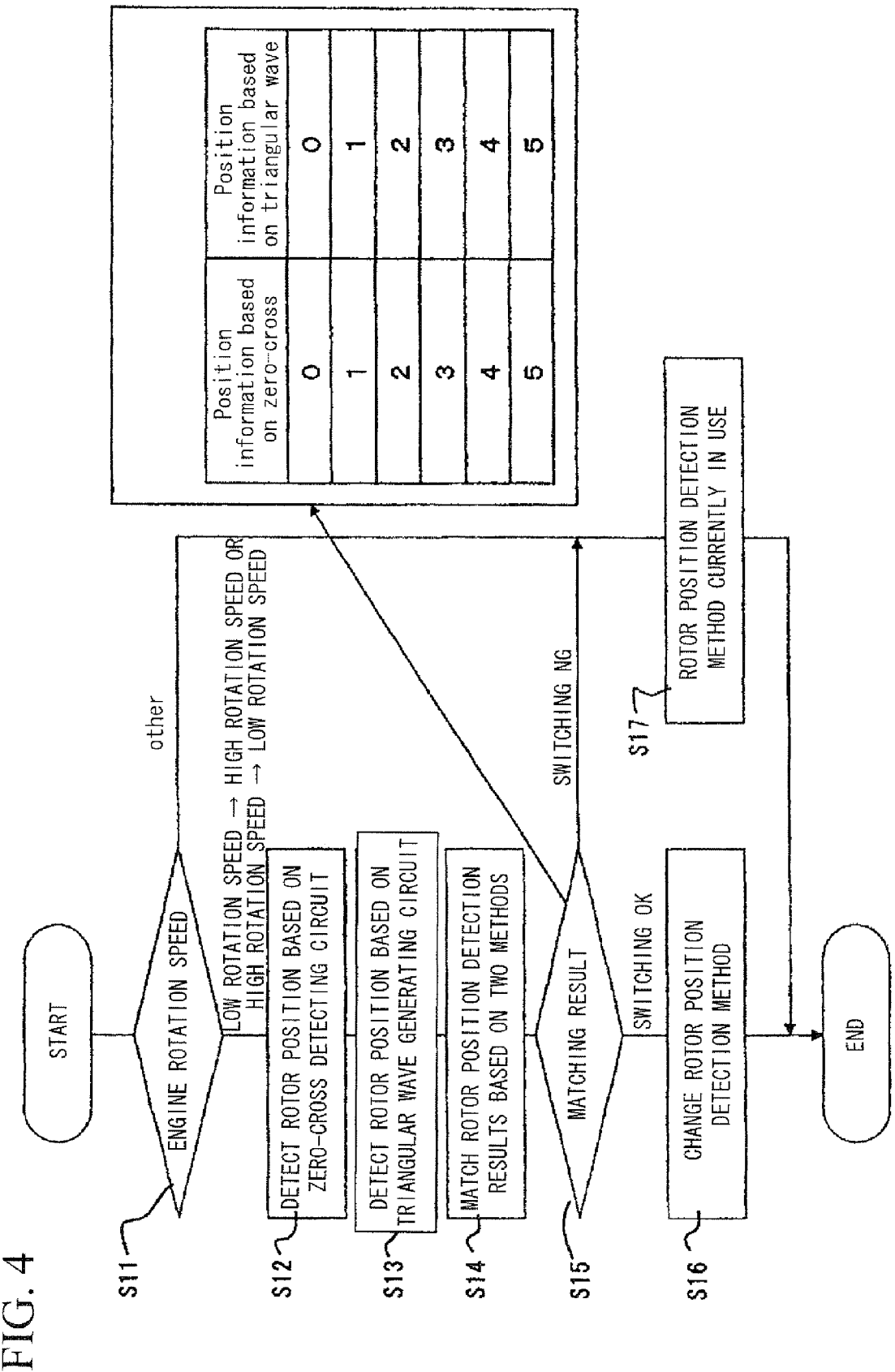
FIG. 4 is a flow chart showing a flow of switching processing of the rotor position detecting method.

FIG. 4 is a flow chart showing a processing flow of rotor position detection switching, being a flow chart showing in detail the determination processing in step S3 of FIG. 3. Hereunder, there is described a flow of the processing, with reference to the flow chart of FIG. 4.

First, a change in engine rotation speed is determined (step S11). In this case, with a predetermined engine rotation speed as a reference, it is determined either that the engine rotation speed has shifted from a low rotation speed to a high rotation speed, or that it has shifted from a low rotation speed to a high rotation speed. In step S11, if it is determined that the engine rotation speed has not changed, the processing shifts to step S17, and the rotor position detection method currently in use remains in use (step S17).

If it is determined that the engine rotation speed has changed, rotor position detection information based on the zero-cross detecting circuit is obtained (step S12), and moreover rotor position detection information based on the triangular wave generating circuit is obtained (step S13).

Then, matching is compared between the rotor position detection results based on these two methods (step S14), and the matching result is determined (step S15). If matching is determined in the determination of the matching result in step S15, the rotor position detection method is changed (step S16). If matching is not determined in the determination of the matching result in step S15, the rotor position detection method currently in use remains in use (step S17).

In the matching determination in step S15, for example, switching is to be determined as OK if the rotor position information based on a zero-cross point detection (six segments from 0 to 5 per 60°) and the rotor position detection information based on a triangular wave signal (six segments from 0 to 5 per 60°) are in a same segment.

Through the processing procedures described above, it becomes possible to perform motor control by selecting a rotor position detection method according to an activation when the motor is in a stop state, a 120° conduction when the motor is rotating at a low rotation speed, and a 180° conduction when the motor is rotating at a high rotation speed (in other words, according to the engine rotation speed).

As described above, in the brushless motor control device of the present invention, in a case where the brushless motor is in a stop state, a positive and negative voltage are applied between two phase coils among the coils of the respective phases U, V, and W, to thereby detect a rotor stop position based on a current rise characteristic. In a case where the motor is rotating at a low rotation speed, a 120° conduction is performed, and a rotor position is detected based on the zero-cross point signal of the voltage induced in a non-conduction phase. Moreover, in a case where the motor is rotating at a high rotation speed, a 180° conduction is performed, and there is generated a triangular wave signal that is synchronized with the voltage induced in the sub coil provided in any one phase of the phases U, V, and W, and a rotor position is detected based on this triangular wave signal. Thus, in the brushless motor, it becomes possible, without implementing a Hall element in the respective phases U, V, and W, or implementing a magnet for position detection separately from the rotor, to perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

The above embodiment of the brushless motor control device according to the present invention, in a case where the motor is rotating at a high rotation speed is configured such that: a 180° conduction is performed when the motor is rotating at a high rotation speed; when in this 180° conduction, the triangular wave generating circuit generates a triangular wave signal that is synchronized with the voltage induced in the sub coil provided in any one phase of the phases U, V, and W; the rotor position detecting unit detects a rotor position based on this triangular wave signal; and while detecting the rotor position, stage switching is performed where 1/3 voltage, 2/3 voltage, and 3/3 voltage are taken as stage switching points (stages of phase voltage per 60° to be applied to the phase coils U, V, and W). However, the above rotor position detection when in the 180° conduction, and the stage switching of the phase voltage of the three phases, can also be realized in a method other than one that generates a triangular wave signal that is synchronized with the voltage induced in the sub coil.

That is to say, the brushless motor control device according to the present invention may, as another embodiment, be configured as described below. The brushless motor control device of this other embodiment: drives a brushless motor including coils of three phases U, V, and W and a neutral line in a stator, and further including a sub coil provided in any one phase of the phases U, V, and W, for detecting a voltage induced in the coil of the one phase; includes a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, and includes: a current rise detecting circuit that, when the brushless motor is in a stop state, sequentially selects coils of two phases among the coils of the respective phases U, V, and W, applies positive and negative predetermined direct current voltages between the selected coils of the two phases, and detects a value of the electric current flowing to the selected coils of the two phases; a rotor stop position detecting unit that determines a rotor stop position of the brushless motor based on information of the value of the electric current flowing to the respective coils which is detected by the current rise detecting circuit; a zero-cross detecting circuit that, when the brushless motor is in a 120° conduction, detects zero-cross points of the coils of the respective phases U, V, and W and generates zero-cross signals; a rotor position detecting unit based on a zero-cross signal that determines a rotor position of the brushless motor based on the zero-cross signals of the coils of the respective phases U, V, and W generated by the zero-cross detecting circuit, and that outputs it as first rotor position information; a rotor position detecting unit based on a measurement of time between zero-crosses that, when the brushless motor is in a 180° conduction, detects an output voltage of the sub coil and detects zero-crosses of the output voltage, measures a time between adjacent zero-crosses of the detected output voltage, determines a rotor position of the brushless motor based on timing calculated from the measured time between the adjacent zero-crosses, and outputs it as second rotor position information; and a motor control unit that controls the brushless motor based on information of the rotor stop position when activating the brushless motor, controls the brushless motor based on the first rotor position information when in the 120° conduction, and controls the brushless motor based on the second rotor position information when in the 180° conduction.

In the brushless motor control device of this other embodiment of the present invention having the configuration described above, in respective cases where the motor is in a stop state, where the motor is rotating at low rotation speed, and where the motor is rotating at high rotation speed, the rotor position detection methods and brushless motor control methods are switched. In a case where the motor is in a stop state, a positive and negative direct current voltage are applied between two phase coils among the respective coils of U, V, and W phases, to thereby detect a rotor stop position based on a current rise characteristic. When the motor is rotating at a low rotation speed, a 120° conduction is performed. When performing the 120° conduction, a non-conduction phase occurs in the respective phases of U, V, and W, and consequently, based on the signal of the zero-cross point of the voltage induced in this non-conduction phase, a rotor position is detected. Moreover, in a case where the motor is rotating at a high rotation speed, a 180° conduction is performed, zero-crosses of the voltage (output voltage of the sub coil) induced in the sub coil provided in any one phase of the phases U, V, and W, are detected, the time between the detected adjacent zero-crosses of the output voltage is measured, and the rotor position of the brushless motor is detected based on timing calculated from the measured time between the adjacent zero-crosses. Moreover, 1/3T, 2/3T, and 3/3T where the time T between the adjacent zero-crosses is divided into three, are taken as switching points of stages (stages of phase voltage per 60° to be applied to the phase coils U, V, and W). Thereby, the stages are switched while detecting the rotor position.

Thus, in the brushless motor, it becomes possible, without implementing a Hall element in the respective phases U, V, and W, or implementing a magnet for position detection separately from the rotor, to perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

The embodiments of the present invention have been described above. However, the brushless motor control device of the present invention is not limited to the aforementioned illustrative examples, and various modifications may be made without departing from the scope of the present invention.

INDUSTRIAL APPLICABILITY

The present invention may be applied to a brushless motor control device and a brushless motor control method. According to the brushless motor control device and the brushless motor control method, it is possible, without implementing a Hall element in the respective phases U, V, and W of the brushless motor, or implementing a magnet for position detection separately from the rotor, to reliably perform an activation when the motor is in a stop state, a 120° conduction when the motor is rotating at a low rotation speed, and a 180° conduction when the motor is rotating at a high rotation speed. Therefore, it is possible to supply an inexpensive brushless motor control device. Moreover, the number of components of a sensorless motor (brushless motor) can be reduced while reducing the size and weight thereof.

The invention claimed is:

1. A brushless motor control device that drives a brushless motor including a stator having coils of three phases U, V, and W and a neutral line, and a sub coil provided in any one phase of the phases U, V, and W, for detecting a voltage induced in the coil of the one phase, the brushless motor control device carrying out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, the brushless motor control device comprising:

a current rise detecting circuit that, when the brushless motor is in a stop state, sequentially selects coils of two phases among the coils of the respective phases U, V, and W, applies positive and negative predetermined direct current voltages between the selected coils of the two phases, and detect a value of the electric current flowing to the selected coils of the two phases;

a rotor stop position detecting unit that determines a rotor stop position of the brushless motor based on information of the value of the electric current flowing to the respective coils which is detected by the current rise detecting circuit;

a zero-cross detecting circuit that, when the brushless motor is in a 120° conduction, detects zero-cross points of the coils of the respective phases U, V, and W and generates zero-cross signals;

a rotor position detecting unit based on a zero-cross signal that determines a rotor position of the brushless motor based on the zero-cross signals of the coils of the respective phases U, V, and W generated by the zero-cross detecting circuit, and that outputs the same as first rotor position information;

a triangular wave generating circuit that, when the brushless motor is in a 180° conduction, detects an output voltage of the sub coil, and generates a triangular wave signal synchronized with the output voltage;

a rotor position detecting unit based on a triangular wave signal that determines a rotor position of the brushless motor based on the triangular wave signal generated by the triangular wave generating circuit, and outputs the same as second rotor position information; and a motor control unit that controls the brushless motor based on information of the rotor stop position when activating the brushless motor, controls the brushless motor based on the first rotor position information when in the 120° conduction, and controls the brushless motor based on the second rotor position information when in the 180° conduction.

2. The brushless motor control device according to claim 1, comprising:

an engine rotation speed calculating unit that calculates a rotation speed of the engine, wherein the motor control unit selects the 120° conduction from a motor activation to the predetermined rotation speed, and selects the 180° conduction when the rotation speed is higher than or equal to the predetermined rotation speed, based on information of the rotation speed of the engine calculated by the engine rotation speed calculating unit, and the motor control unit selects the first rotor position information when in the 120° conduction, and selects the second rotor position information when in the 180° conduction, to thereby control the brushless motor.

3. The brushless motor control device according to claim 1,
wherein the triangular wave generating circuit generates the triangular wave signal both when in the 120° conduction and in the 180° conduction, and
wherein the rotor position detecting unit based on the triangular wave signal determines the rotor position based on the triangular wave generated by the triangular wave generating circuit both when in the 120° conduction and in the 180° conduction.

4. The brushless motor control device according to claim 3, comprising:
a rotor position information switching determination unit that determines whether or not to perform switching between the first rotor position information and the second rotor position information by comparing the engine rotation speed obtained from the engine rotation speed calculating unit with a predetermined rotation speed, and outputs a switching signal in a case where it is determined to perforin switching;
a rotor position information matching unit that determines matching between the first rotor position information and the second rotor position information according to a predetermined criterion, based on the switching signal output from the rotor position information switching determination unit; and
a rotor position information switching unit that switches between the first rotor position information and the second rotor position information and outputs it to the motor control unit, in a case where it is determined that there is matching by the rotor position information matching unit.

5. A brushless motor control device that drives a brushless motor including a stator having coils of three phases U, V, and W and a neutral line, and a sub coil provided in any one phase of the phases U, V, and W, for detecting a voltage induced in the coil of the one phase, the brushless motor control device carrying out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, the brushless motor control device comprising:
a current rise detecting circuit that, when the brushless motor is in a stop state, sequentially selects coils of two phases among the coils of the respective phases U, V, and W, applies positive and negative predetermined direct current voltages between the selected coils of the two phases, and detects a value of the electric current flowing to the selected coils of the two phases;
a rotor stop position detecting unit that determines a rotor stop position of the brushless motor based on information of the value of the electric current flowing to the respective coils which is detected by the current rise detecting circuit;
a zero-cross detecting circuit that, when the brushless motor is in a 120° conduction, detects zero-cross points of the coils of the respective phases U, V, and W and generates zero-cross signals;
a rotor position detecting unit based on a zero-cross signal that determines a rotor position of the brushless motor based on the zero-cross signals of the coils of the respective phases U, V, and W generated by the zero-cross detecting circuit, and that outputs the same as first rotor position information;
a rotor position detecting unit based on a measurement of time between zero-crosses that, when the brushless motor is in a 180° conduction, detects an output voltage of the sub coil and detects zero-crosses of the output voltage, measures a time between adjacent zero-crosses of the detected output voltage, determines a rotor position of the brushless motor based on timing calculated from the measured time between the adjacent zero-crosses, and outputs the same as second rotor position information; and
a motor control unit that controls the brushless motor based on information of the rotor stop position when activating the brushless motor, controls the brushless motor based on the first rotor position information when in the 120° conduction, and controls the brushless motor based on the second rotor position information when in the 180° conduction.

6. A brushless motor control method for a brushless motor control device that drives a brushless motor used as a starter motor of an engine, including a stator having coils of three phases U, V, and W and a neutral line, and a sub coil provided in any one phase of the phases U, V, and W, for detecting a voltage induced in the coil of the one phase, the brushless motor control device carrying out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, the brushless motor control method comprising:
a current rise detecting step of, when the brushless motor is in a stop state, sequentially selecting coils of two phases among the coils of the respective phases U, V, and W, applying positive and negative predetermined direct current voltages between the selected coils of the two phases, and detecting a value of the electric current flowing to the selected coils of the two phases;
a rotor stop position detecting step of determining a rotor stop position of the brushless motor based on information of the value of the electric current flowing to the respective coils which is detected in the current rise detecting step;
a zero-cross detecting step of, when the brushless motor is in a 120° conduction, detecting zero-cross points of the coils of the respective phases U, V, and W and generating zero-cross signals;
a rotor position detecting step based on a zero-cross signal of determining a rotor position of the brushless motor based on the zero-cross signals of the coils of the respective phases U, V, and W generated by the zero-cross detecting step, and outputting the same as first rotor position information;
a triangular wave generating step of, when the brushless motor is in a 180° conduction, detecting an output voltage of the sub coil, and generating a triangular wave signal synchronized with the output voltage;
a rotor position detecting step based on a triangular wave signal of determining a rotor position of the brushless motor based on the triangular wave signal generated in the triangular wave generating step, and outputting the same as second rotor position information; and
a motor control step of controlling the brushless motor based on information of the rotor stop position when activating the brushless motor, controlling the brushless motor based on the first rotor position information when in the 120° conduction, and controlling the brushless motor based on the second rotor position information when in the 180° conduction.

7. A brushless motor control method for a brushless motor control device that drives a brushless motor used as a starter motor of an engine, including a stator having coils of three phases U, V, and W and a neutral line, and a sub coil provided in any one phase of the phases U, V, and W, for detecting a voltage induced in the coil of the one phase, the brushless motor control device carrying out a conduction control function, for the respective phase coils of the brushless motor, that performs a 120° conduction when a rotation speed of the brushless motor is lower than or equal to a predetermined rotation speed, and that performs a 180° conduction when the rotation speed is higher than or equal to the predetermined rotation speed, the brushless motor control method comprising:

a current rise detecting step of, when the brushless motor is in a stop state, sequentially selecting coils of two phases among the coils of the respective phases U, V, and W, applying positive and negative predetermined direct current voltages between the selected coils of the two phases, and detecting a value of the electric current flowing to the selected coils of the two phases;

a rotor stop position detecting step of determining a rotor stop position of the brushless motor based on information of the value of the electric current flowing to the respective coils which is detected in the current rise detecting step;

a zero-cross detecting step of, when the brushless motor is in a 120° conduction, detecting zero-cross points of the coils of the respective phases U, V, and W and generating zero-cross signals;

a rotor position detecting step based on a zero-cross signal of determining a rotor position of the brushless motor based on the zero-cross signals of the coils of the respective phases U, V, and W generated in the zero-cross detecting step, and outputting the same as first rotor position information;

a rotor position detecting step based on a measurement of time between zero-crosses of, when the brushless motor is in a 180° conduction, detecting an output voltage of the sub coil and detecting zero-crosses of the output voltage, measuring a time between adjacent zero-crosses of the detected output voltage, determining a rotor position of the brushless motor based on timing calculated from the measured time between the adjacent zero-crosses, and outputting the same as second rotor position information; and a motor control step of controlling the brushless motor based on information of the rotor stop position when activating the brushless motor, controlling the brushless motor based on the first rotor position information when in the 120° conduction, and controlling the brushless motor based on the second rotor position information when in the 180° conduction.

* * * * *

UNITED STATES PATENT AND TRADEMARK OFFICE
CERTIFICATE OF CORRECTION

| | |
|---|---|
| PATENT NO. | : 8,106,612 B2 |
| APPLICATION NO. | : 12/594064 |
| DATED | : January 31, 2012 |
| INVENTOR(S) | : Harada |

It is certified that error appears in the above-identified patent and that said Letters Patent is hereby corrected as shown below:

Title Page, should read

(73) Assignee: SHINDENGEN ELECTRIC MANUFACTURING CO., LTD., Tokyo (JP)

Signed and Sealed this
Eighth Day of May, 2012

David J. Kappos
*Director of the United States Patent and Trademark Office*